United States Patent [19]
Nishida

[11] Patent Number: 5,497,196
[45] Date of Patent: Mar. 5, 1996

[54] VIDEO CAMERA HAVING AN ADAPTIVE AUTOMATIC IRIS CONTROL CIRCUIT

[75] Inventor: Kazuhito Nishida, Tochigi, Japan

[73] Assignee: Sharp Kabushiki Kaisha, Japan

[21] Appl. No.: 227,670

[22] Filed: Apr. 14, 1994

Related U.S. Application Data

[63] Continuation of Ser. No. 849,673, Mar. 11, 1992, Pat. No. 5,331,422.

[30] Foreign Application Priority Data

Mar. 15, 1991 [JP] Japan ........................................ 3-51702
Jan. 27, 1992 [JP] Japan ........................................ 4-12140

[51] Int. Cl.$^6$ ................................................. H04N 5/238
[52] U.S. Cl. ........................................... 348/363; 348/364
[58] Field of Search ...................................... 348/362, 363, 348/364, 366; 354/410, 412, 430; 250/201.7; 382/14, 15; 395/20, 21, 23; H04N 5/238

[56] References Cited

U.S. PATENT DOCUMENTS 4,965,443 10/1990 Yamasaki et al. ..................... 250/201.7
4,978,990 12/1990 Yamasaki et al. ...................... 354/432

FOREIGN PATENT DOCUMENTS

0356123A3   2/1990   European Pat. Off. ....... H04N 5/232
0411318     2/1991   European Pat. Off. ....... H04N 5/238
0411318A1   6/1991   European Pat. Off. ....... H04N 5/232
296724      4/1990   Japan .............................. G03B 7/28
3117982     5/1991   Japan .............................. H04N 5/232

OTHER PUBLICATIONS

"Artificial Neural Networks: Theoretical Concepts" V. Vemuri, 1988, I.E.E.E. Computer Society Press.

*Primary Examiner*—Joseph Mancuso
*Assistant Examiner*—Tuan V. Ho

[57] ABSTRACT

A video camera includes a lens, an iris and an iris driving circuit, an image sensor, a circuit for dividing the picture into a plurality of sub-areas for extracting the luminance of each sub-area according to the luminance signal provided from the image sensor as a luminance distribution signal, a circuit for generating a signal defining a target value of an iris driving signal, an adaptive circuit using an artificial neural network to which the luminance distribution signal is input for carrying out adaptive conversion so that the offset between a provided teacher signal and its own output is minimized, and a switch for selecting either the target value signal or the output of the adaptive circuit to provide the same as a teacher signal to the adaptive circuit.

2 Claims, 15 Drawing Sheets

VIDEO CAMERA HAVING AN ADAPTIVE AUTOMATIC IRIS CONTROL CIRCUIT

This application is a continuation of application Ser. No. 07/849,673, filed on Mar. 11, 1992, U.S. Pat. No. 5,331,422 the entire contents of which are hereby incorporated by reference.

BACKGROUND OF THE INVENTION

1. Field of the Invention

The present invention relates to video cameras, and more particularly, to an automatic iris control circuit for automatically adjusting the aperture size to regulate the amount of light incident into the optical system of a video camera according to the incident amount of light.

2. Description of the Background Art

Referring to FIG. 1, a conventional video camera includes a lens 102 for bringing together incident light from an object to form an image on a predetermined image formation plane, an image sensing device 104 having an image sensing plane arranged on the image sensing plane for converting the optical image on the image sensing plane into a video signal which is an electrical signal by photoelectric conversion, an iris plate 103 for regulating the amount of light incident upon image sensing device 104, an iris motor 113 for driving iris plate 103, a preamplifier 116 for amplifying the video signal provided from image sensing device 104 and providing the same into a signal processing circuit (not shown) for converting into a television method, and an automatic iris control circuit 217 responsive to the video signal provided from preamplifier 116 for operating iris motor 113 so that the level of the video signal attains a predetermined level.

Automatic iris control circuit 217 includes a gain control amplifier (GCA) 206 for amplifying the video signal provided from preamplifier 116 corresponding to the central portion of the screen by a gain that is greater than that of the remaining portion of the screen, a voltage adder 207 for adding to the amplified video signal provided from GCA 206 sawtooth voltage that will raise the voltage in the lower portion of the screen, a detection circuit 208 for averaging the outputs of voltage adder 207, and a comparator 209 having a negative input terminal connected to the output of detection circuit 208 and a positive input terminal connected to a variable reference voltage ($V_{IR}$) 210 for comparing the signal provided from detection circuit 208 and reference voltage 210 to drive iris motor 113 according to the comparison output.

Referring to FIG. 2, the amplification carried out in GCA 206 is for the purpose of giving a particularly great weight to the central portion 252 of a screen 251. When object 254 is located at the central portion 252, as shown in FIG. 3A, iris plate 103 is driven to obtain an appropriate image sensing state of object 254 owing to the amplification by GCA 206. Even if there is ground 255 in the background scenery with rear light, photometry is carried out giving weight to object 254 rather than to ground 255 or the background scenery.

Referring to FIG. 2 again, voltage adder 207 adds offset voltage to the lower region 253 of screen 251. In the case where sawtooth voltage such as that shown in FIG. 1 is added, the weight for control of iris plate 103 becomes greater as a function of distance towards the bottom of screen 251. Therefore, when object 256 is located with the sky as the background in screen 251 as shown in FIG. 3B, the diaphragm is adjusted to a value that can shoot object 256 in an optimum state without being affected by the luminance of the sky.

Referring to FIG. 1, a conventional video camera operates as follows. The incident amount of light from object 101 forms an image on the image sensing plane of image sensing device 104 by lens 102. Image sensing device 104 converts the optical image into a video signal by photoelectric conversion. The video signal is provided to preamplifier 116. Preamplifier 116 amplifies output of image sensing device 104 to provide the same to a signal processing circuit and the input of GCA 206.

As already described with reference to FIGS. 2 and 3A, GCA 206 amplifies the converted video signal corresponding to the central region of the screen by a gain that is greater than that of the surrounding region. The amplified signal is provided to voltage adder 207. As described with reference to FIGS. 2 and 3B, voltage adder 207 adds sawtooth voltage to the input signal so that the video signal representing the lower region of the screen becomes a greater value. This signal is provided to detection circuit 208, where the video signals from voltage adder 207 are averaged and provided to the negative input terminal of comparator 209. Comparator 209 compares the output of detection circuit 208 and reference voltage 210 to drive iris motor 113 according to the comparison output. Iris motor 113 drives iris plate 103 according to the drive voltage. The amount of light of the object image upon image sensing device 104 is adjusted by the open/close of iris plate 103.

The detailed operation of automatic iris control circuit 217 is as follows.

If the luminance of the object image is too bright, the amplitude of the image signal provided from preamplifier 116 becomes great. This increases the average voltage of the video signal provided from detection circuit 208. If the output voltage of detection circuit 208 becomes greater than reference voltage 210, the output of comparator 209 shifts to a low potential. Iris motor 113 responds to the output of comparator 209 to be operative to close iris plate 103. This reduces the incident of light from the object to image sensing device 104.

If the incident amount of light from the object to image sensing device 104 is low, an operation opposite to that described above is carried out. That is to say, the output voltage of detection circuit 208 decreases to become lower than reference voltage 210. The output of comparator 209 shifts to a high potential so that iris motor 113 operates to open iris plate 103. Thus, the incident amount of light to image sensing device 104 increases.

By the above-described operation of the automatic iris control circuit, the aperture size of iris plate 103 is adjusted to obtain a maximum luminance of an object located in the central and lower region of the screen. The operator of the video camera does not have to manually adjust the aperture size to obtain a desired shooting state.

As described above, a video camera having a conventional automatic iris control circuit employs center-weighted metering and foot-weighted metering. This is based on the typical shooting condition where an object is usually located at the central region of a screen, and that the sky is located above as the background with the object in the lower region. However, there are some cases where center-weighted metering and foot-weighted metering may not result in an optimum diaphragm.

Consider the case where the entire background of object 254 is of high luminance in screen 251, as shown in FIG. 3C. In this case, the luminance of the lower portion of screen 251 becomes high. If foot-weighted metering is employed, the diaphragm will be operated towards the closing direction. This means that the sensed image of object 254 becomes dark.

Consider the case where object 254 is not located in the center portion 252, as shown in FIG. 3C. In this case, most of central portion 252 becomes a high luminance portion. The diaphragm will be operated towards the closing direction. This will also result in a very dark sensed image of object 254.

The above-described object state is not so rare. This is often encountered when shooting at a ski resort, for example. In this case, the background scenery is snow, which has a very high luminance. The state such as shown in FIG. 3C may often be seen in ski resorts.

For users that often shoot at a ski gelände, optimum aperture value could not be obtained by automatic iris control with the conventional center-weighted metering or foot-weighted metering, resulting in an unsatisfactory picture. There are some video cameras that can adjust the diaphragm manually. However, it is very difficult to control the iris while shooting. There was a problem that control of the iris could not be carried out easily with the above-described conventional video camera.

A technique, not directed to a video camera, but to a still camera, is disclosed in Japanese Patent Laying-Open No. 2-96724 for controlling the camera according to the condition of the object.

Referring to FIG. 4, the still camera disclosed in Japanese Patent Laying-Open No. 2-96724 includes a lens 320, a diaphragm 319 provided in front of lens 320, and an in-focus mechanism 335 for focusing the optical image of an object at a predetermined image formation plane by moving lens 320 along the optical axis. The optical image of the object is provided to an amplifier 322 as data representing the luminance of the object for each photoelectric converted device by an image sensing device 321 formed of photoelectric conversion devices allocated in a matrix manner. The luminance information of the object amplified by amplifier 322 is A/D converted by A/D converter 323 to be provided to an operation circuit 324 as a stepped down luminance BV'. Operation circuit 324 is previously input with an aperture value $AV_0$ representing the open aperture of diaphragm 319. Operation circuit 324 calculates and provides the actual luminance BV (=BV'−$AV_0$) of the object from the two values of BV' and $AV_0$. The output object luminance BV is provided to a multiplexer 328 and a frame memory 334. The operation of multiplexer 328 will be described afterwards.

Frame memory 334 stores object luminance BV according to the output of each photoelectric conversion device of image sensing device 321 for each photoelectric conversion device. Frame memory 334 is connected to a neuro-computer 325, to which the luminance information stored in frame memory 334 is supplied, and from which signal $P_{xy}$ representing the position of the main object of the video stored in frame memory 334 is output. Neuro-computer 325 is connected to a coefficient memory 326 for storing coefficient $W_{ji}$ to determine the operational process carried out by neuro-computer 325. Coefficient $W_{ji}$ is rewritten to obtain an appropriate output corresponding to the input in the learning process of neuro-computer 325.

The output of neuro-computer 325 is connected to one input of a selector 336. The output of selector 336 is connected to multiplexer 328. The output of an operation panel 327 is connected to the other input terminal of selector 336. The output of operation panel 327 is also connected to neuro-computer 325. Operation panel 327 is for the purpose of providing to neuro-computer 325 a signal $tp_i$ representing the location of the main object from the picture stored in the frame memory 334 at the time of the learning mode. Operation panel 327 includes a touch panel switch (not shown), for example, having a one-to-one correspondence to the position of the screen.

The user inputs the position of the main object on the screen while looking through the finder, whereby signal $tp_i$ representing the position of the main object is provided from operation panel 327 to neuro-computer 325. Neuro-computer 325 carries out operation according to the coefficient stored in coefficient memory 326 by the input provided from frame memory 334 to temporarily determine an output. Neuro-computer 325 also compares signal $t_{pi}$ provided from operation panel 327 with its own output to rewrite coefficient $W_{ji}$ in coefficient memory 326 so that the offset is minimized. By repeating such learning several times, an artificial neural network implemented with neuro-computer 325 and coefficient memory 326 is self-organized to provide an appropriate signal $P_{xy}$ according to the input from frame memory 334.

The output of operation panel 327 is also provided to selector 336. At the time of learning mode, selector 336 provides the output of operation panel 327 to multiplexer 328. At the time of automatic mode, selector 326 provides the output of neuro-computer 325 to multiplexer 328. Multiplexer 328 passes only output BV of the photoelectric conversion device corresponding to the main object of the screen designated by control signal $P_{xy}$ provided from neuro-computer 325 or operation panel 327. The passed output BV is provided to operation circuits 329 and 331.

Operation circuit 329 carries out operation for focus-detection according to the so-called hill-climbing method based on luminance output BV of the photoelectric conversion device corresponding to the main object. The output of operation circuit 329 is provided to a driver 330. Driver 330 moves in-focus mechanism 335 according to the supplied operation result to move lens 320 in its optical axis direction. By operation circuit 329, lens 320 stops at a location so that an image is formed on the light receiving plane of image sensing device 321.

Operation circuit 331 determines the shutter speed or the signal value according to luminance BV of the main portion of the object provided from multiplexer 328, film sensitivity SV, aperture value AV of diaphragm 319, and the set shutter speed TV. The determined shutter speed and aperture value are provided to a shutter control device 332 and an iris control device 333, respectively.

Thus, the still camera disclosed in Japanese Patent Laying-Open No. 2-96724 has the aperture value, the shutter speed, and the in-focus position determined according to the luminance information of not the entire object, but only the main portion of the object. The position of the main object is detected by neuro-computer 325. This is carried out according to the learning process specified by the user through operation panel 327. Therefore, the detection of the position of the main portion of the object can be carried out similarly as to the liking of the user. It is described in the aforementioned Japanese Patent Application that the main object can be photographed under an appropriate shooting state by controlling the camera according to the luminance of the main object.

However, the technique of Japanese Patent Laying-Open No. 2-96724 is directed to a still camera. There is no disclosure as to how this technique is applied to a video camera. Although it is suggested in Japanese Patent Laying-Open No. 2-96724 that it is possible to provide as a teacher signal an exposure correction signal according to the brightness or the luminance pattern of the object to such a neuro-computer for carrying out learning such as retrogressive correction, no specific structure is taught.

The still camera described in the embodiment of the Japanese Patent Application which is controlled according to the luminance information of only the main object has the following problems which will be described hereinafter. The relation between the luminance information of the background scenery excluding the main object and the luminance signal of the main object is critical in obtaining an optimum aperture value. However, it is impossible to optimize the luminance balance between the main object and the background with the technique disclosed in Japanese Patent Laying-Open No. 2-96724. This is not a problem in practice for a silver salt camera represented by a still camera since luminance adjustment can be carried out at the time of printing. However, for a video camera, there is a limitation in carrying out luminance adjustment at the time of reproduction. The technique disclosed in Japanese Patent Laying-Open No. 2-96724 cannot be applied to a video camera.

There is also another problem. It is general to use the output of the image sensing device to obtain a video signal for the control of the diaphragm in a video camera. The number of photoelectric conversion devices that are allocated in the image sensing device is significant to comply with the high requirements of the picture quality. If the technique disclosed in Japanese Patent Laying-Open No. 2-96724 is applied to a video camera and the output of each photoelectric conversion device is stored in a frame memory to be provided to the neuro-computer, the number of inputs for the neuro-computer will become too great and not appropriate for practical use. A great number of inputs for the neuro network will result in a problem of a longer time period for the learning process of the neural network. Furthermore, if the output of the photoelectric conversion device is directly input to the neural network, the input value to the neural network will vary greatly in response to just a slight change in position of the object, resulting in an unstable operation of the neural network.

SUMMARY OF THE INVENTION

An object of the present invention is to provide a video camera that can automatically control the diaphragm to an aperture value that the user feels optimum according to a specific state of the object.

Another object of the present invention is to provide an automatic camera that can control the diaphragm automatically and stably to an aperture value that the user feels optimum according to a specific state of the object.

A further object of the present invention is to provide a video camera that can automatically control the diaphragm to an aperture value that the user feels optimum, and that can learn to realize automatic diaphragm that the user feels optimum for various states.

Still another object of the present invention is to provide a video camera that can control automatically the diaphragm to an aperture value that the user feels optimum according to a specific state of the object, and that can carry out stably and speedily learning for realizing automatic diaphragm that the user feels optimum for various conditions.

The video camera according to the present invention includes an optical system for gathering incident light from an object for forming an image on a predetermined image formation plane, an iris and an iris driving circuit for regulating the incident amount of light in response to a supplied incident light amount regulating signal, an image sensor for image sensing an optical image of the object formed in a predetermined frame for providing a luminance signal, and a luminance distribution characteristics extraction circuit connected to the image sensor to divide the frame in which the optical image is formed into a plurality of sub-areas for extracting the luminance distribution characteristics of the optical image in the frame as the luminance for each sub-area according to the luminance signal and for providing the same as a plurality of luminance distribution signals. The video camera includes a target value signal generating circuit for generating a target value signal to determine a target value of the incident light amount regulating signal that can be arbitrary set by the user according to the luminance distribution of the optical image, an adaptive circuit using an artificial neural network to which a plurality of luminance distribution signals are input and from which an incident light amount regulating signal obtained by a predetermined conversion is provided, for adapting conversion so that the offset of the output with respect to a provided teacher signal is minimized, and a selecting circuit responsive to the operation of the user for selecting one of the output of the target value signal and the adaptive circuit for providing the same as a teacher signal to the adaptive circuit.

The image formed by the optical system in the video camera is converted into a luminance signal by the image sensor. The frame of a picture is divided into plurality of sub-areas, whereby the luminance for each sub-area is extracted from the luminance signal as the characteristics of the luminance distribution of the picture. The extracted characteristics of the luminance distribution of the picture is provided to the artificial neural network of the adaptive circuit as a plurality of luminance distribution signals. The artificial neural network applies a predetermined conversion to the plurality of luminance distribution signals to provide the same as an incident light amount regulating signal. At the time of learning of the artificial neural network, the selecting circuit provides the target value signal set by the user as the teacher signal. The adaptive circuit has the conversion carried out internally adapted so that the offset between the teacher signal and its own output is minimized. At the time of normal operation, the adaptive circuit processes the luminance distribution signals according to the conversion adapted during the learning process to provide the same to the iris driving circuit. Therefore, the value of the incident light amount regulating signal at the time of normal operation takes a value according to the users preference which is learned based on various states. Optimum aperture can be obtained automatically thereafter just by a slight manual operation even in special states which could not be obtained in the conventional automatic iris control. An optimum aperture value taking into consideration the luminance balance between the main object and the background can be obtained in the artificial neural network, resulting in a picture having satisfactory balance in luminance all over the entire screen.

The luminance distribution characteristics extraction circuit in the video camera of a preferred embodiment of the present invention includes an A/D converting circuit for A/D (analog-digital) converting the video signal provided from the image sensor for providing the same as a luminance data indicating the luminance of the optical image, and an average luminance calculating circuit to integrate luminance data for each sub-area by a predetermined time period for calculating the average luminance for each sub-area to provide the same as a luminance distribution signal.

In the video camera, the luminance data for each sub-area of the screen is extracted, whereby the average luminance thereof is calculated for each sub-area to be provided to the adaptive circuit as the luminance distribution signal. Because the luminance is averaged for each sub-area, there is no great change in the luminance distribution signal when there is a slight movement of the object. A stable automatic iris control can be realized. Furthermore, the number of inputs to the artificial neural network will not become too great.

The artificial neural network of the adaptive circuit in the video camera according to another embodiment of the present invention includes: an intermediate layer having a plurality of neurons, each carrying out a predetermined conversion for a set of the luminance distribution signals for obtaining one output; an output layer having a plurality of neurons, each carrying out a predetermined conversion to the signal provided from the intermediate layer for obtaining one output; an output converting circuit for carrying out a predetermined conversion to the set of signals provided from the output layer for obtaining a single incident light amount regulating signal; and a conversion updating circuit for adaptively updating the conversion carried out in the intermediate layer and the output layer according to the difference between the output of the output layer and the teacher signal so that the offset thereof is minimized.

In this video camera, each neuron in the intermediate layer of the artificial neuron network carries out a predetermined conversion for the set of input luminance distribution signals for obtaining one output, which is provided to each neuron of the output layer. Each neuron in the output layer carries out a predetermined conversion to the signal provided from the intermediate layer to obtain one output, which is provided to the output converting circuit. The output converting circuit carries out a predetermined conversion to the set of outputs of the output layer to provide an incident light amount regulating signal. The conversion carried out in each converting circuit of the intermediate layer and the output layer is adaptively updated so that the difference between the output of the output converting circuit and the provided teacher signal is minimized. As a result, the conversion carried out in each converting circuit is updated according to each repetition of the learning process of the artificial neural network, whereby learning is carried out that realizes automatic diaphragm such that the user feels optimum in various states.

Each neuron in the intermediate layer and the output layer of the artificial neural network of the video camera according to a further preferred embodiment of the present invention includes a weighting circuit for giving a predetermined weight to each input signal, an adding circuit for adding all the weighted signals, and a function converting circuit for converting and providing the output of the adding circuit according to a predetermined monotone increasing function. The conversion updating circuit includes a weight updating circuit for recalculating and updating each weight so that the root mean square of the offset is minimized according to the offset between the output of the output converting circuit and a teacher signal.

Each converting circuit of this video camera applies a predetermined weight to the input thereof, followed by addition and a predetermined function conversion to obtain one output. This weighting value is sequentially recalculated and updated by the weight updating circuit so that the root mean square of the offset between the teacher signal and the output of the neuron network is minimized. Thus, the so-called error backpropagation rule is realized, whereby a stable and rapid learning is carried out.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The foregoing and other objects, features, aspects and advantages of the present invention will become more apparent from the following detailed description of the present invention when taken in conjunction with the accompanying drawings, which are given by way of illustration only, and thus are not limitative of the present invention, and wherein.

DESCRIPTION OF THE PREFERRED EMBODIMENTS

Figure 5:
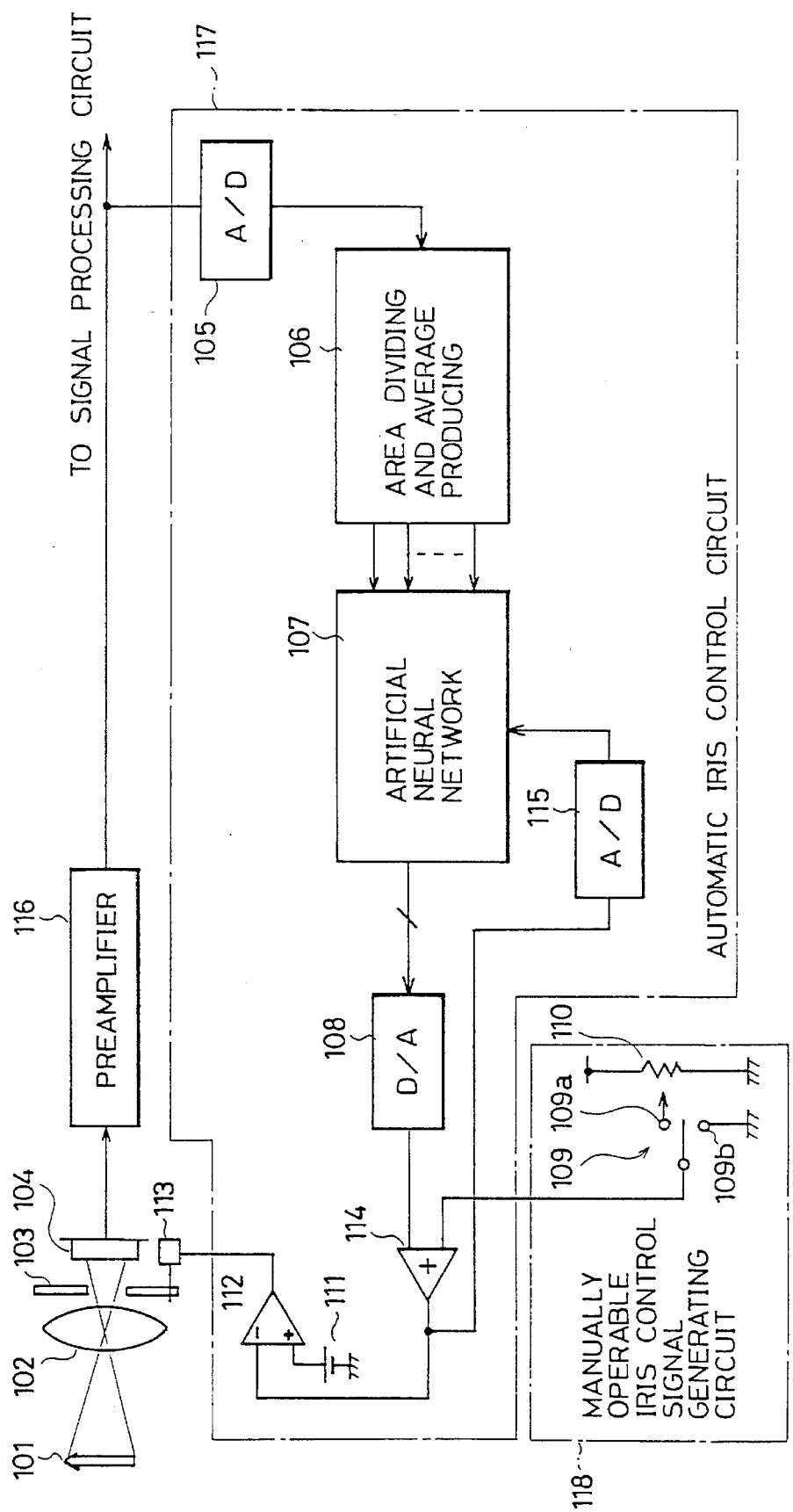
FIG. 5 is a block diagram showing an example of a video camera according to the present invention.

FIG. 5 is a block diagram of a video camera according to an embodiment of the present invention. Referring to FIG.

5, the video camera includes lens 102 as the optical system for gathering the incident light from object 1 and forming an image on a predetermined image formation plane, a CCD image sensor 104 for image sensing the optical image of object 101 formed on a predetermined frame by lens 102 for converting the same into a video signal which is an electrical signal, an iris plate 103 for regulating the incident amount of light to image sensor 104, an iris motor 113 for driving iris plate 103 according to the provided incident light amount regulating signal, i.e. iris control voltage, a preamplifier 116 for amplifying the video signal provided from image sensor 104 to provide the same to a signal processing circuit, an automatic iris control circuit 117 responsive to the level of the video signal provided from preamplifier 116 for providing an iris control voltage to drive iris motor 113 according to an iris control pattern learned by the iris control process set manually by a user, and a manually operable iris control signal generating circuit 118 connected to automatic iris control circuit 117 for providing a teacher signal thereto in the learning of the automatic iris control pattern of automatic iris control circuit 117.

Automatic iris control circuit 117 includes an A/D converter 105 for A/D (analog-digital) converting the luminance component of the video signal amplified by preamplifier 116, an area dividing and average producing circuit 116 for dividing the screen into a plurality of sub-areas and integrating the luminance data provided from A/D converter 105 for a predetermined time period for each sub-area for calculating the average luminance to provide an average luminance signal for each sub-area, an artificial neural network (referred to as ANN hereinafter) 107 responsive to the average luminance signal provided from area dividing and average producing circuit 106 for recognizing the pattern of the luminance distribution pattern in the screen to carry out conversion conforming to the iris control by the user obtained by learning for providing in a digital value the optimum aperture size, a D/A converter 108 connected to the output of ANN 107 for D/A (digital-analog) converting the digital signal representing an optimum aperture value provided from ANN 107, an adder 114 for adding and providing the offset voltage representing the offset between the aperture value which is the target value set by the user which is provided from manual iris control signal generating circuit 118 and the output of ANN 107, a comparator 112 for comparing the output voltage of adder 114 and reference voltage 111 for driving iris motor 113 according to the comparison output, and an A/D converter 115 for A/D converting the output of adder 114 for providing to ANN 107 a teacher signal for learning.

Manual iris control signal generating circuit 118 includes a variable resistor 110 connected between a predetermined power supply potential and ground potential, and a switch 109 having one input terminal 109a connected to variable resistor 110, the other input terminal 109b connected to ground potential, and the output terminal connected to one input of adder 114.

Figures 6, 7:
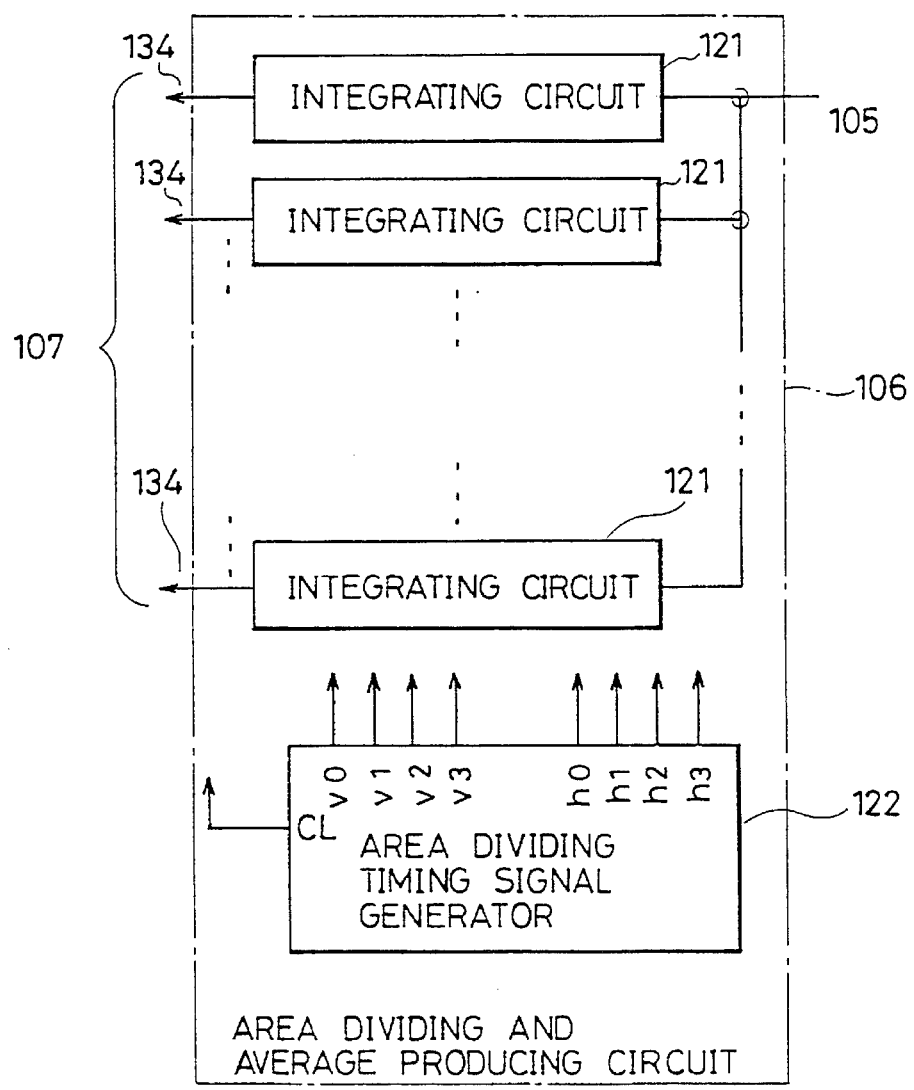
FIG. 6 is a schematic diagram showing an example of a divided screen.
FIG. 7 is a block diagram of an area dividing and average producing circuit.

Referring to FIG. 6, area dividing and average producing circuit 106 divides screen 251 into 4×4 sub-areas of $a_{00}$–$a_{33}$, where each area is equal in size. Area dividing and average producing circuit 106 obtains the average luminance for each sub-region for a predetermined time period to provide the same as the luminance data of each sub-region.

Figure 1:
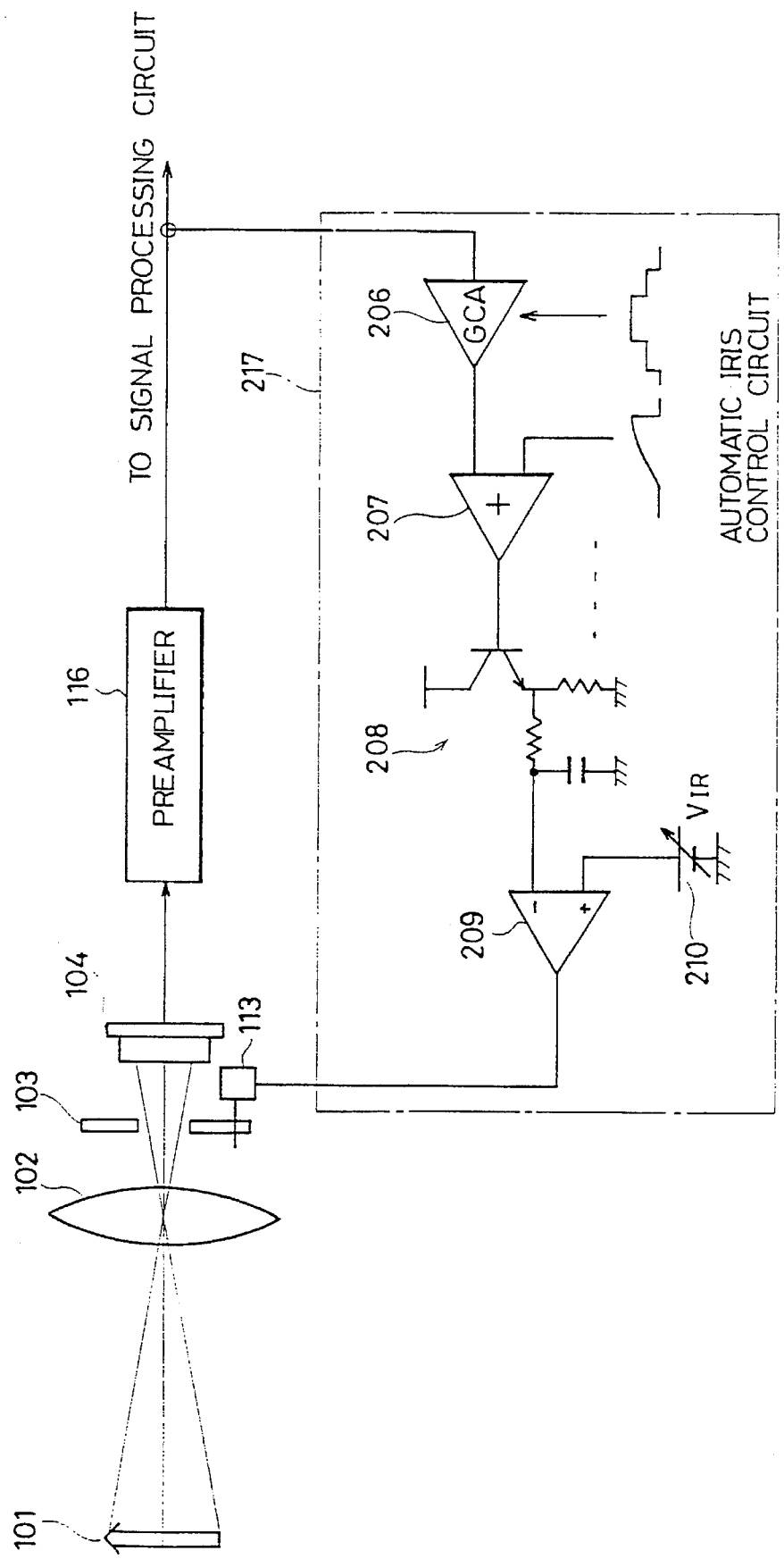
FIG. 1 is a block diagram of a video camera having a conventional automatic iris control circuit.
Figure 2:
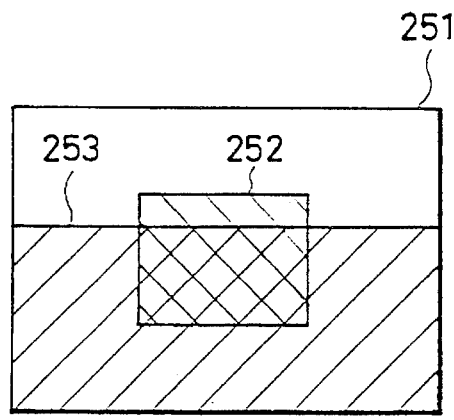
FIG. 2 is a schematic diagram of a picture for describing center-weighted metering and foot-weighted metering.
Figure 3A:
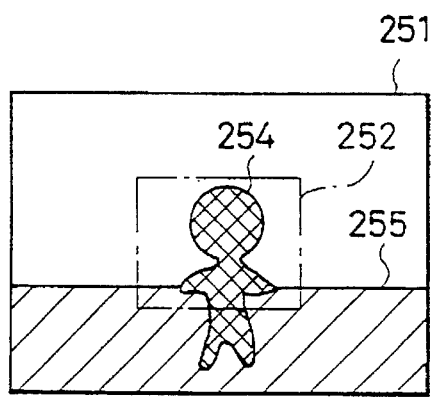
FIGS. 3A–3C are schematic diagrams showing conventional photometry methods.
Figure 3B:
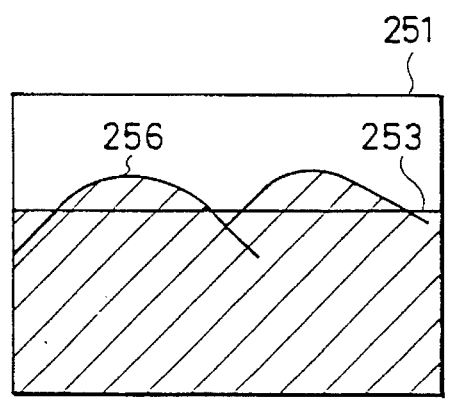
Figure 3C:
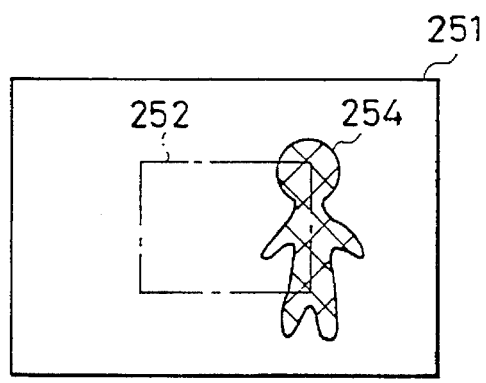
Figure 4:
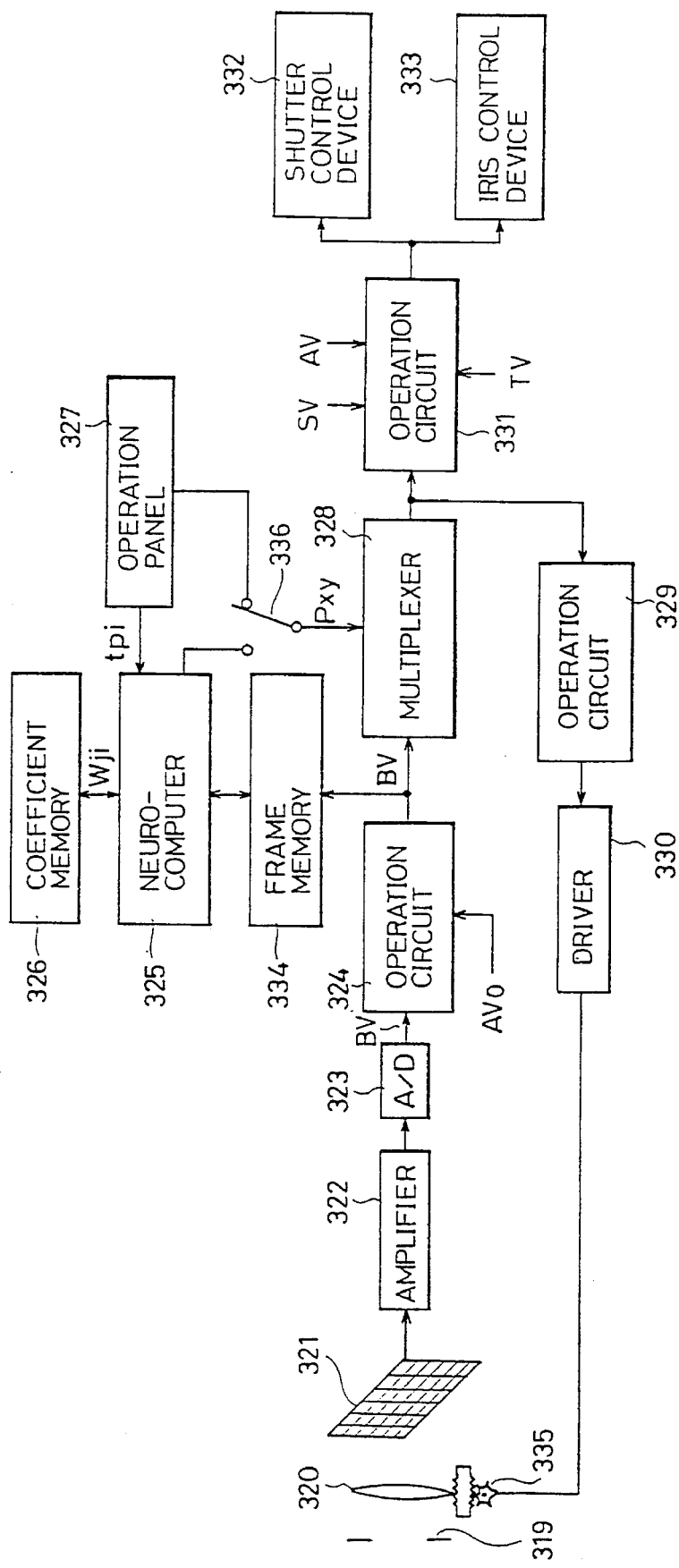
FIG. 4 is a block diagram of a conventional still camera using neural network.

Referring to FIG. 7, area dividing and average producing circuit 106 includes a plurality of integrating circuits 121 provided corresponding to the number of sub-areas for integrating luminance signals from one of the sub-areas of $a_{00}$–$a_{33}$ (refer to FIG. 2) for a predetermined time period to provide to ANN 107 an integrated value, and an area dividing timing signal generator 122 for generating and providing to each integrating circuit 121 area dividing timing signals v0–v3 and h0–h3 for allowing integration of the luminance data from only the corresponding area and a clear signal CL for clearing the integration for each screen to provide the same to each integrating circuit 121.

Figure 8:
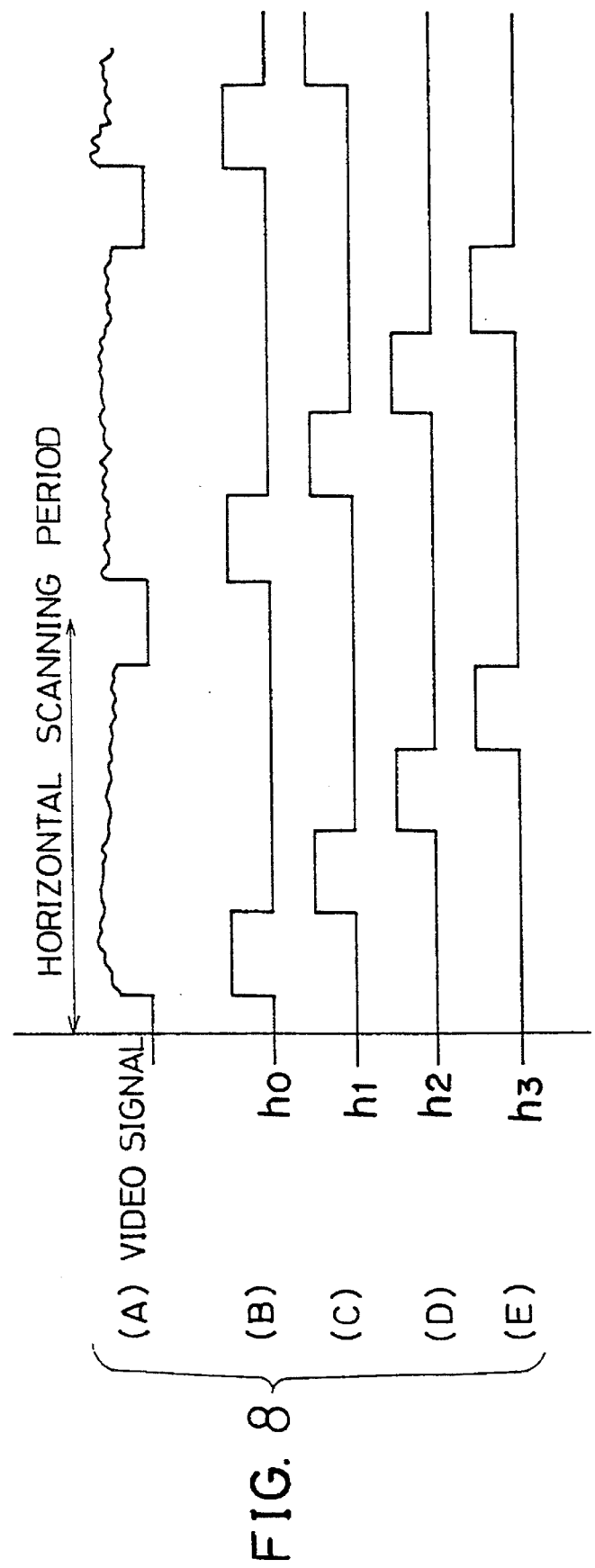
FIG. 8 illustrates waveform charts of horizontal area pulses for dividing the screen.

Regarding the area dividing timing signals, signals h0–h3 are area pulses for indicating the time of dividing screen 251 (FIG. 6) along the line in the vertical direction. It is assumed that a video signal in the waveform shown in FIG. 8(A) is provided to A/D converter 105 (FIG. 5). Referring to FIG. 8 (B), signal h0 attains a high potential from the beginning of the video period of each horizontal scanning period. This high potential of signal h0 is maintained for ¼ of the video period. Signal h0 has a low potential in the remaining period.

Referring to FIG. 8 (C), signal h1 attains a high potential in response to the fall of signal h0. Signal h1 maintains the high potential state for ¼ of the video period and attains a low potential at the remaining period. Referring to FIGS. 8 (D) and (E), signals h2 and h3 attain a high potential in response to the fall of signals h1 and h2, respectively, and maintain the high potential state for ¼ of the video period. Signals h2 and h3 are both held at a low potential in the remaining period.

Figure 9:
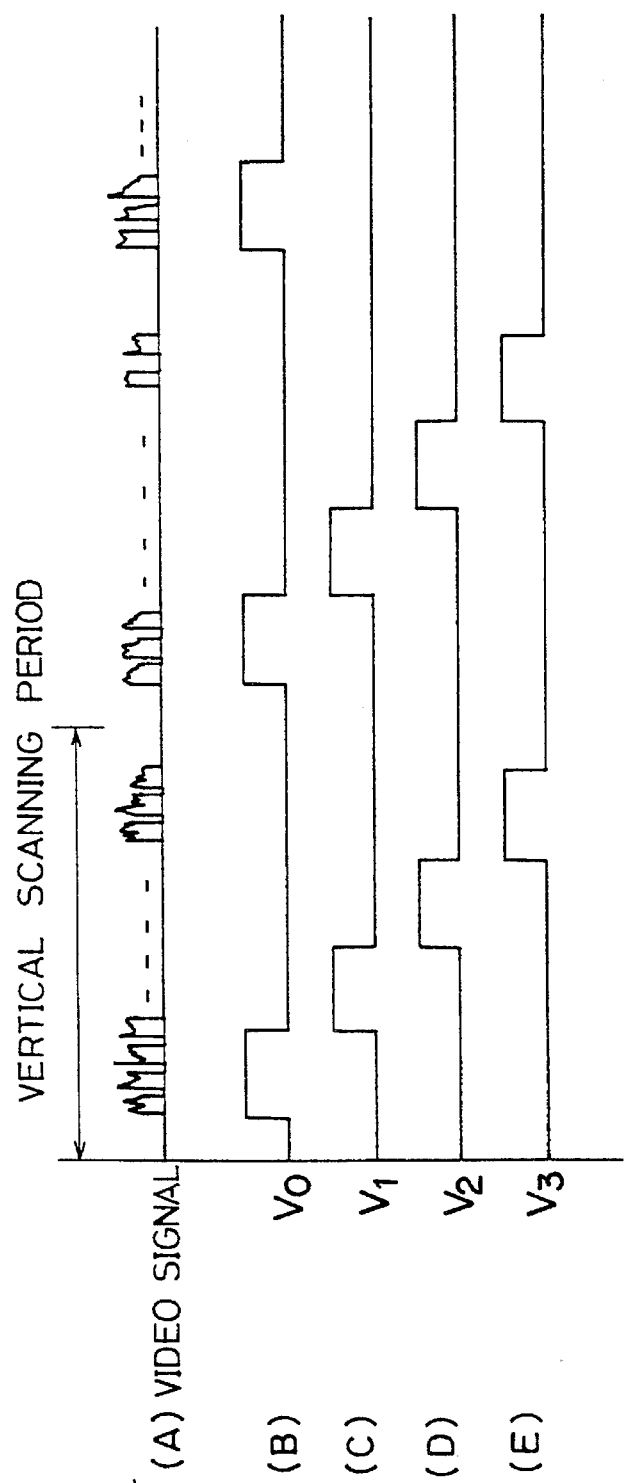
FIG. 9 illustrates waveform charts of vertical area pulses for dividing the screen.

Signals v0–v3 are signals indicating the timing for dividing screen 251 along the line in the horizontal direction. It is assumed that the video signal has a waveform shown in FIG. 9 (A). Referring to FIGS. 9 (B)–(E), the vertical scanning period having the region including the effective video signal is divided into 4. Signals v0–v3 attain a high potential in the first, the second, the third and the fourth period, respectively, of the period divided into 4. Signals v0–v3 attain a low potential in their respective remaining periods.

By combining one of signals h0–h3 and one of signals v0–v3, and integrating the luminance of the video signal when both signals attain a high potential, the luminance data can be obtained for one of the sub-areas $a_{00}$–$a_{33}$ shown in FIG. 6.

Integrating circuit (i, j) 121 for integrating luminance data of sub-area $a_{ij}$ includes an adder 124 having one input connected to A/D converter 105, a register 123 for storing added data provided from adder 124, and a gate circuit 125 for ANDing clock signal CLK provided from area dividing timing signal generator 122 (refer to FIG. 7) in synchronization with the input luminance data and area pulses $v_i$ and $h_j$ provided from area dividing timing signal generator 122 to control the storing timing of register 123. The output of register 123 is connected to one input of adder 124. The added value of the stored contents of register 123 and the luminance data provided from A/D converter 105 is provided again to register 123 to be added. The clear terminal of register 123 is supplied with clear pulse CL provided for each vertical period by area dividing timing signal generator 122. By clear pulse CL, the contents of register 123 is cleared for each screen.

In the present embodiment, screen 251 is divided into equal sub-areas of $a_{00}$–$a_{33}$ shown in FIG. 6. The number of luminance data sampled from each sub-area is identical. Therefore, the integrated value of the luminance data obtained by register 123 can be directly processed as the luminance average of the sub-area. The output 134 of integrating circuit 121 is provided to ANN 107.

Figure 11:
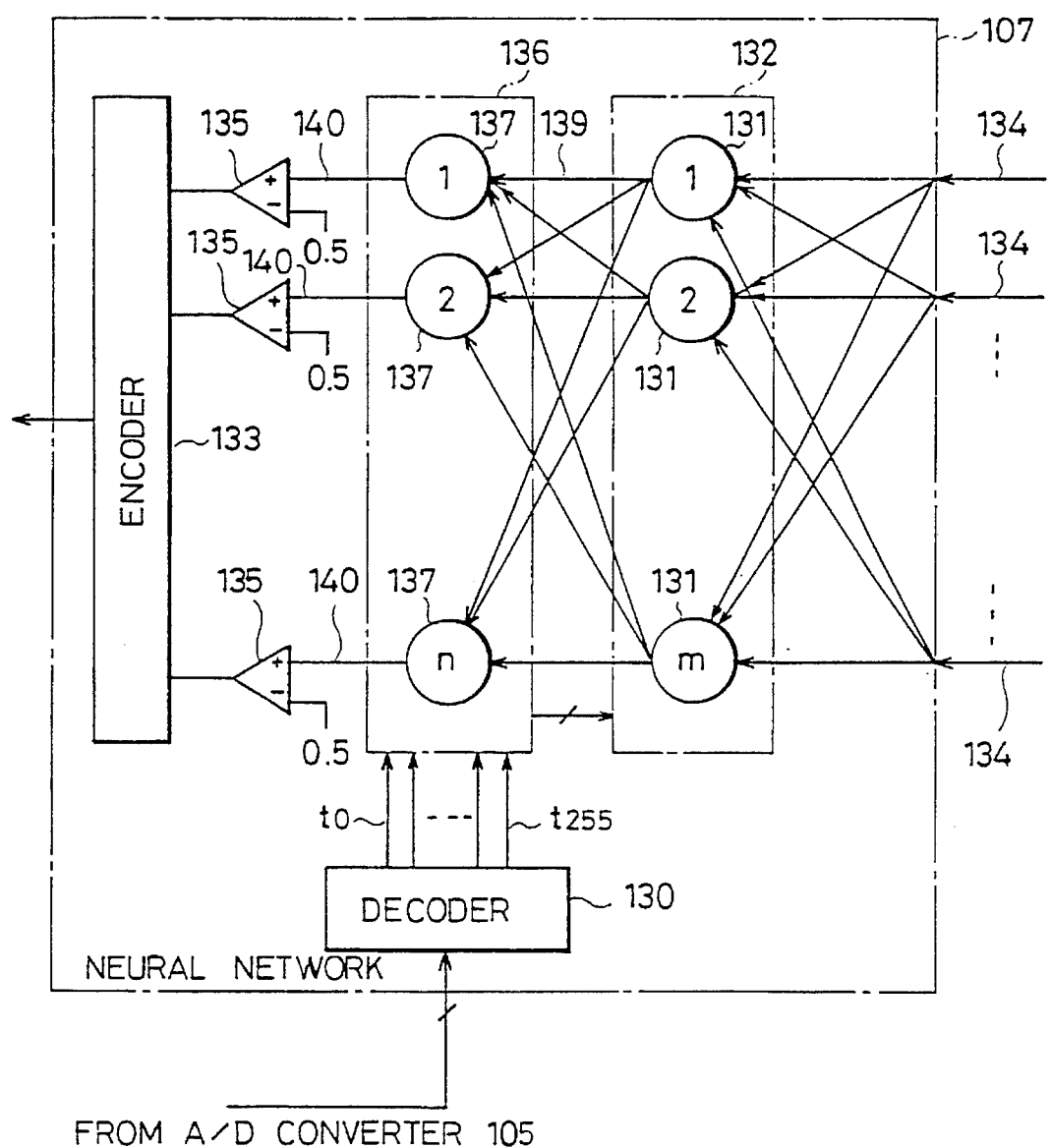
FIG. 11 is a block diagram of a neural network.

FIG. 11 is a block diagram schematically showing ANN 107. The operation mechanism of the neural network is described in, for example, "Using Neural Network for Pattern Recognition, Signal Processing and Knowledge Process" *Nikkei Electronics,* Aug. 10, 1987, No. 427 pp. 115–124), *Neuro-Computer* (by Toyohiko Kikuchi, published by OHM issued in 1990), and *Artificial Neural Networks-Theoretical Concepts* (ed. V. Vemuri, Washington D.C, IEEE Computer Press, 1988). The details of the operation mechanism will not be described here.

Referring to FIG. 11, ANN 107 includes an intermediate layer 132 for applying a predetermined process to luminance average data 134 provided from area dividing and average producing circuit 106 for obtaining an intermediate output, an output layer 136 to apply a predetermined conversion to the output of intermediate layer 132 for obtaining n normalized outputs, and n comparators 135 provided corresponding to each of output layer 136 for comparing the output of output layer 136 with 0.5 for providing an output of 1 or 0 according to the compared value. Intermediate layer 132 includes m neurons 131. Each is applied with all the luminance average data 134 branched by an input layer not shown.

Output layer 136 includes n neurons 137, each having the output connected to the positive input terminal of the corresponding comparator 135 and the input connected to the output of all the neurons 131 in intermediate layer 132. In FIG. 11, neuron 137 of the output layer is designated a serial number of 0 to (n-1).

ANN 107 further includes an encoder 133 for converting the number into a 8-bit data allocated to the neuron 137 connected to the comparator having an output of 1 and providing the same to D/A converter 108, and a decoder 130 having the input connected to A/D converter 115 (refer to FIG. 5) for decoding the signal provided from A/D converter 115 into 1 bit data of t0-t255 to provide the same as a teacher signal to output layer 136.

Each neuron 131 of intermediate layer 132 and each neuron 137 of output layer 136 serve to apply a predetermined weight to each input signal and to carry out addition, followed by a predetermined function conversion to provide the same. Therefore, each of neurons 131 and 137 is provided with a circuit for carrying out weighting for each input and a circuit for sequentially updating the weight according to data t0-255 provided from decoder 130. These circuits are not shown in FIG. 11 for the purpose of simplicity. These circuits will be described with reference to FIGS. 12–15.

The number of neurons 137 in output layer 136 is set to $2^a$ (a is an integer), for example 128 or 256, taking into consideration the encoding of a 8-bit data.

Each neuron 131 of intermediate layer 132 applies a predetermined weight to the input signal, followed by addition and conversion with a particular function. Therefore, each neuron 131 is provided with a weighting circuit for applying weight to each input, and a circuit for updating each weight coefficient according to data for learning provided from output layer 136. These circuits are not indicated in FIG. 11 for the sake of simplicity. These circuits will be described in detail with reference to FIGS. 16–18.

In the ANN shown in FIG. 11, the teacher signal provided from A/D converter 115 is decoded by decoder 130 into one bit signals of t0-t255. The bit signal is provided to output layer 136, whereby each weight coefficient is updated. Using the updated result, each weight coefficient of intermediate layer 132 is updated. In other words, the flow of data at the time of normal operation and that at the time of learning is opposite to each other. Such a learning method is called error backpropagation rule.

Figure 12:
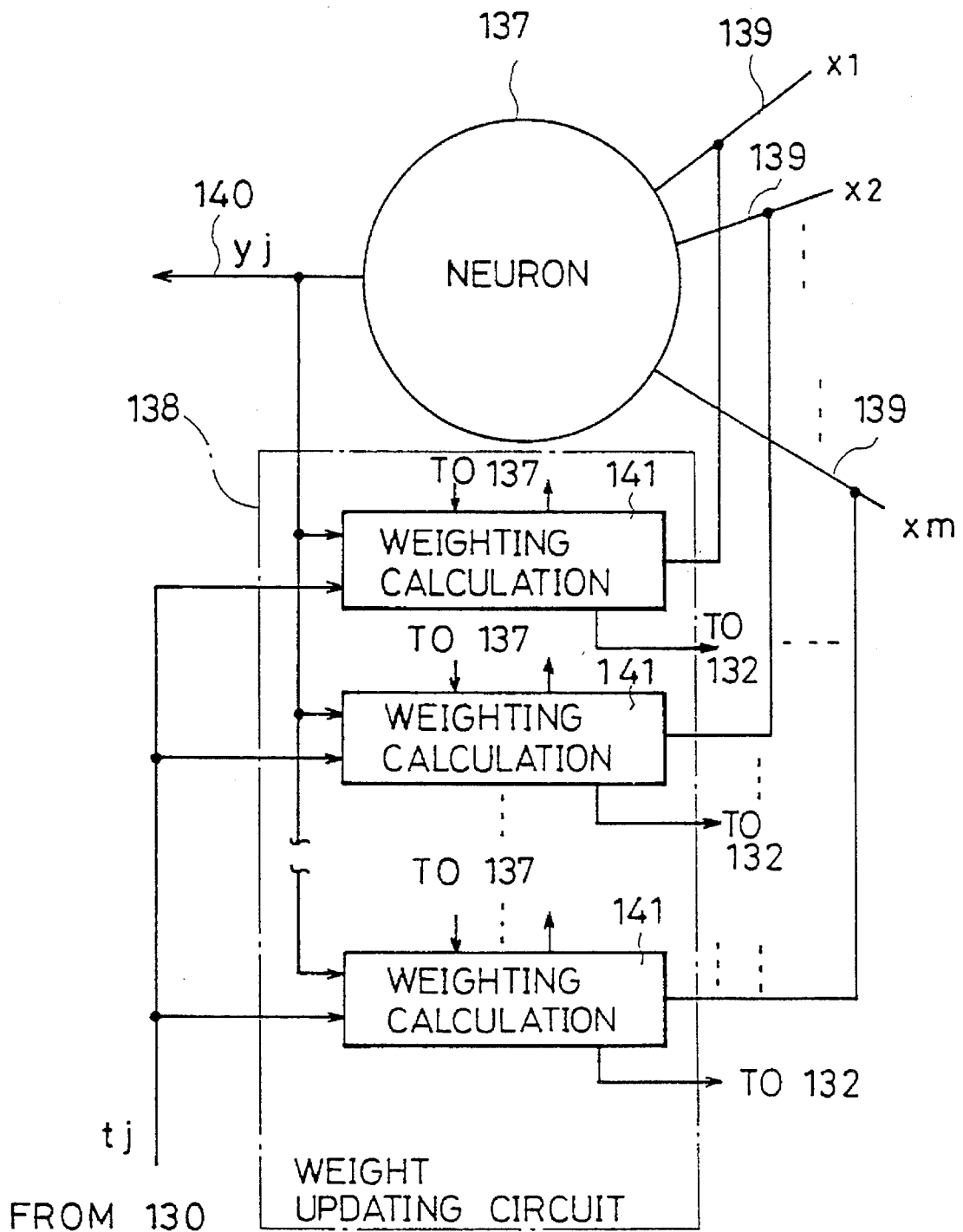
FIG. 12 is a block diagram of a neuron of an output layer and a weight updating circuit.

FIG. 12 is a block diagram of neuron 137 of output layer 136 and a weight updating circuit 138 provided associated with neuron 137 for calculating and updating the weight for output 139 ($x_1$-$x_m$) from intermediate layer 132 provided to neuron 137. Weight updating circuit 138 is not shown in FIG. 11, as described before. Referring to FIG. 12, weight updating circuit 138 includes m weight calculating circuits 141 for carrying out the weight calculation for each of input signals 139 ($x_1$-$x_m$).

It is assumed that neuron 137 is allocated with number j. The output thereof is $y_j$. It is clear from FIG. 12 that weight calculating circuit 141 corresponding to the i-th input signal 139 ($x_i$) recalculates the weight coefficient according to output $y_j$ of neuron 137, 1 bit signal $t_j$ provided from decoder 130, input signal $x_i$, and the weight coefficient corresponding to input signal $x_i$ included in neuron 137 for updating the weight coefficient in neuron 137. The output of weight calculating circuit 141 is provided to each neuron 131 of intermediate layer 132 to be used in updating the weight coefficient of the weight applying process carried out in each neuron 131.

Figure 13:
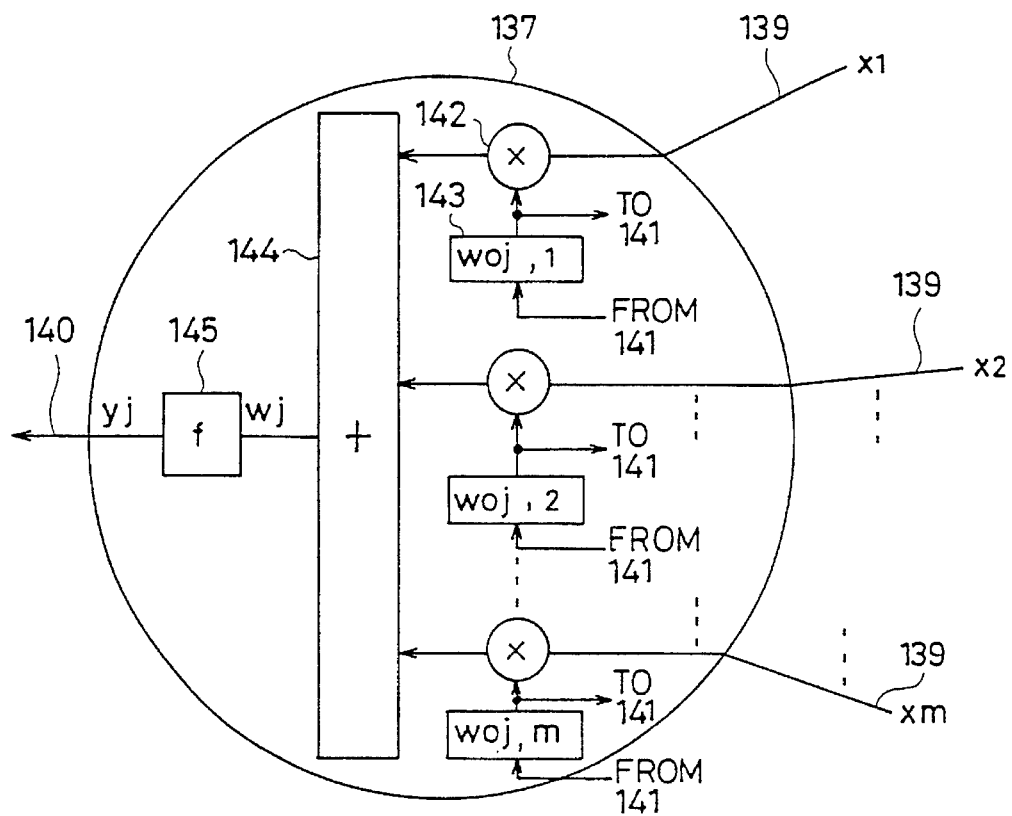
FIG. 13 is a block diagram of a neuron of the output layer.

Referring to FIG. 13, neuron 137 of output layer 136 includes m registers 143 for storing weight coefficients $w0_{j1}$-$w0_{jm}$ corresponding to respective input signals 139 ($x_1$-$x_m$), m multipliers 142 for multiplying respective input signals 139 ($x_1$-$x_m$) by weight coefficients $w0_{j1}$-$w0_{jm}$ stored in the corresponding register 143, an adder 144 for adding all the outputs of the m multipliers 142 for providing an output $w_j0$, and a function generator 145 for carrying out a predetermined conversion f to the output $w0_j$ of adder 144 for providing an output 140 ($y_j$) as the converted result. Weight coefficient $w0_{j1}$-$w0_{jm}$ of each register 143 is updated by the corresponding weight calculating circuit 141. Each weight coefficient of $w0_{j1}$-$w0_{jm}$ is used in the process carried out in weight calculating circuit 141 for the next learning.

The characteristic of function generator 145 is represented as $y_j$=f ($w_j$). Function f is a monotone non-decreasing function. In the present embodiment, a sigmoid function taking the value of intervals (0, 1) is employed as function f. Sigmoid function is defined by the following equation (3). The operation of neuron 137 can be defined by the following three equations.

$$W_1 = \sum_{i=j}^{m} W_{ji} \cdot X_i \tag{1}$$

$$y_j = f(W_j) \tag{2}$$

$$f(W_j) = \frac{1}{1 + \text{Exp}(W_j)} \tag{3}$$

Figure 14:
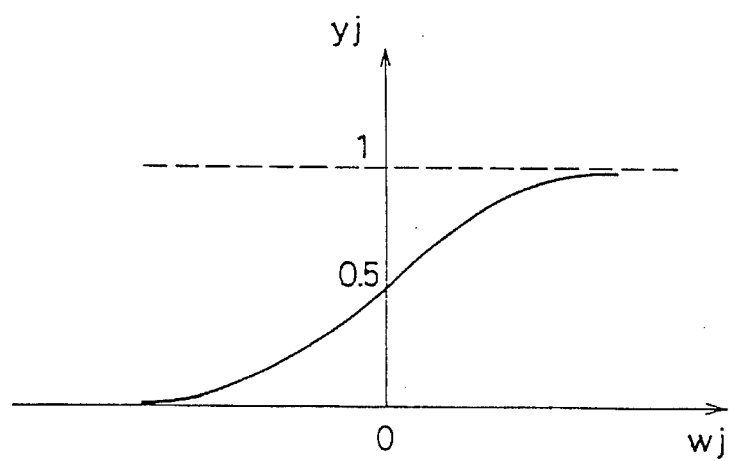
FIG. 14 is a graph showing the characteristics of a sigmoid function of conversion carried out in a function generator.

The above equation (3) representing the sigmoid function is shown in the graph of FIG. 14. It can be appreciated from the graph of FIG. 14 that 0 and 1 are approximated when $w_j$ are $-\infty$ and $+\infty$, respectively. When $w_j$=0, 0.5 holds. Function f is not limited to this sigmoid function, and can take any other function that is a monotone non-decreasing function.

Figure 15:
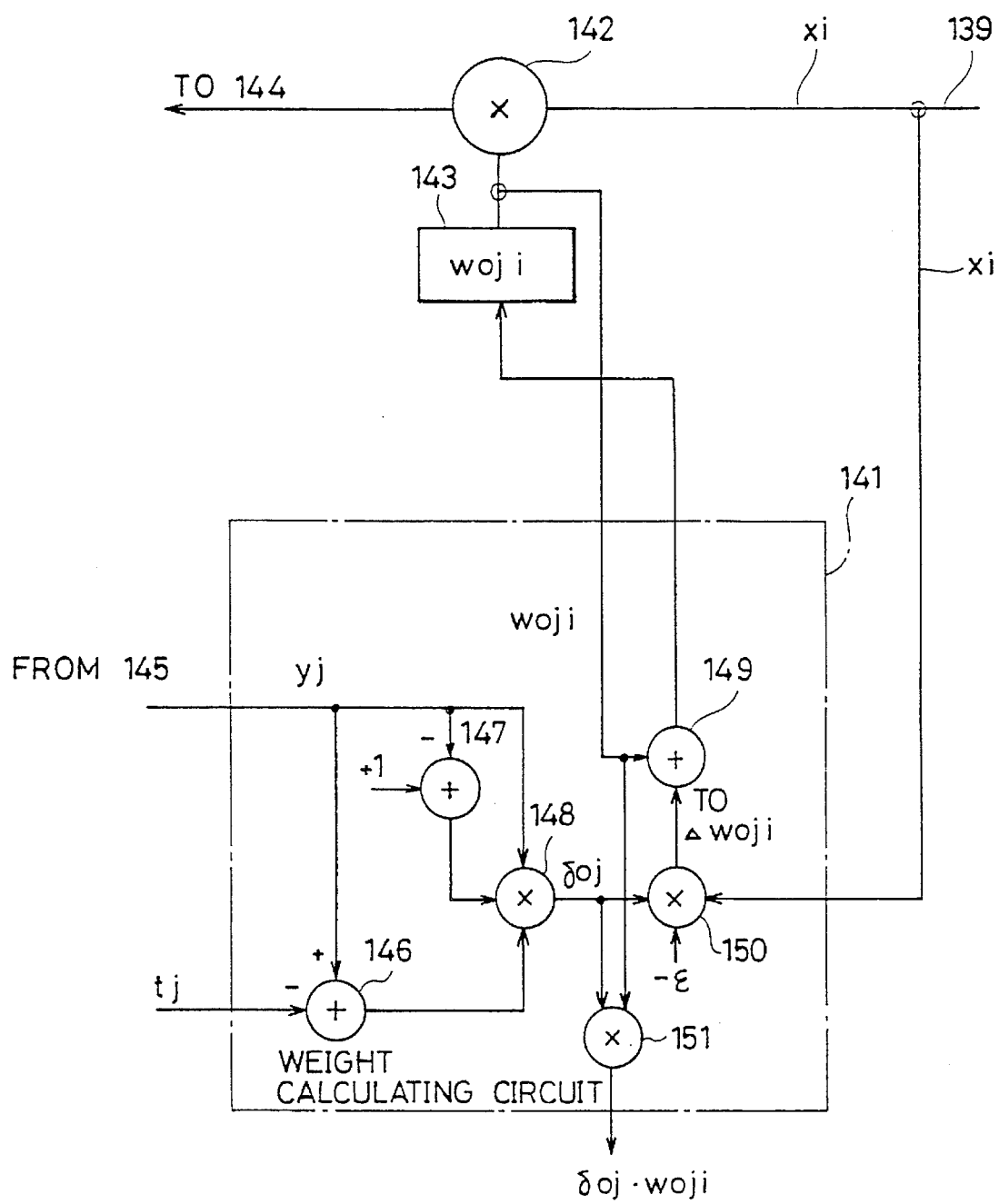
FIG. 15 is a block diagram of a weight calculating circuit for calculating the weight coefficient of the neuron of the output layer.

FIG. 15 is a block diagram of weight calculating circuit 141 for updating the weight for the i-th input 139 (xi) of neuron 137. One neuron includes n weight calculating circuits 141.

Weight coefficient $w0_{ji}$ corresponding to the i-th input $x_i$ carried out by weight calculating circuit 141 is calculated according to the operation indicated by the following equation with output $y_j$ of the output layer and teacher signal $t_j$.

$$\Delta W0_{ji} = \epsilon \cdot \delta 0_j \cdot X_i \tag{4}$$

where $\delta 0_j = (Y_t - t_j) y_j (1 - y_j)$ \hfill (5)

ε : small positive real number

By adding $\Delta w0_{ji}$ to weight coefficient $w0_{ji}$ for the i-th input $x_i$ of the j-th neuron 137 of the output layer, weight coefficient $w0_{ji}$ is updated. The updated weight coefficient $w0_{ji}$ of register 143 is multiplied by input $x_i$ by multiplier 142 to be provided to adder 144 (refer to FIG. 13).

FIG. 15 is a block diagram of weight calculating circuit 141 for carrying out the weight calculation indicated by equations (4) and (5). Referring to FIG. 15, weight calculating circuit 141 includes an adder 146 for obtaining value $(y_j-t_j)$ from output $y_j$ of neuron 137 and teacher signal $t_j$ provided from decoder 130, an adder 147 for generating value $(1-y_j)$ from output $y_j$ of neuron 137, a multiplier 148 for multiplying output $y_j$ of neuron 137 by output $(y_j-t_j)$ of adder 136 by output $(1-y_j)$ of adder 147 for providing value $\delta0_j$ shown in equation (5), a multiplier 150 for multiplying output $\delta0_j$ of multiplier 148 by the i-th input $x_i$ by value $(-\epsilon)$ for calculating value $\Delta w0_{ji}$ shown in equation (4), and an adder 149 for obtaining the difference between weight coefficient $w0_{ji}$ of the i-th input $x_i$ and output $\Delta w0_{ji}$ of multiplier 150 for storing the same as weight coefficient $w0_{ji}$ in register 143.

Weight calculating circuit 141 further includes a multiplier 151 for multiplying output $\delta0_j$ of multiplier 148 by weight coefficient $wo_{ji}$ provided from register 143 for providing the result to intermediate layer 132. The output $\delta0_j \cdot w0_{ji}$ of multiplier 151 is used for updating the weight coefficient in each neuron 131 of intermediate layer 132.

A small positive real number value $\epsilon$ is used in the operation carried out within weight calculating circuit 141. This value is obtained empirically so as to improve the convergence properties of each weight coefficient of the learning process.

Figure 16:
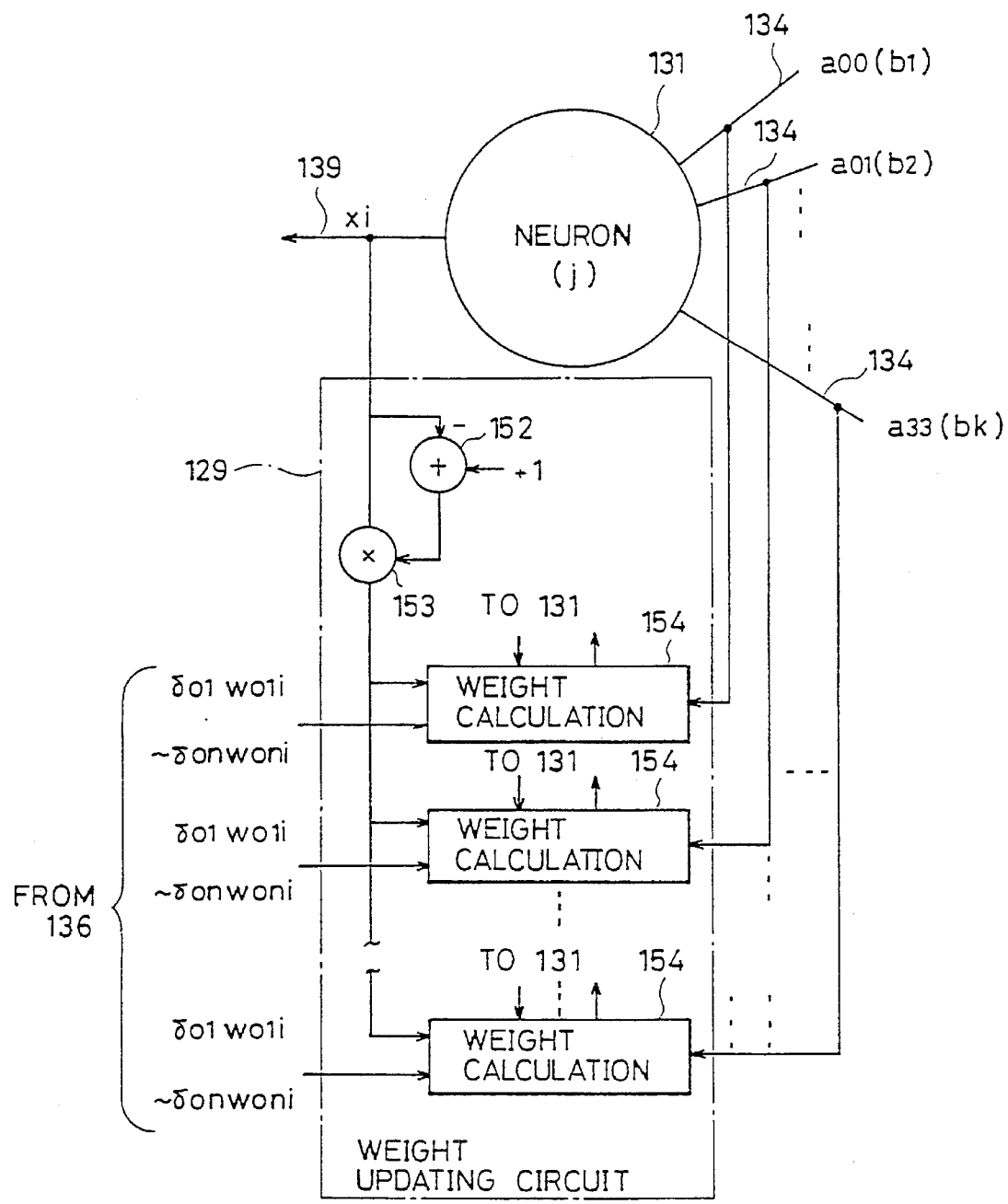
FIG. 16 is a block diagram of a neuron of the input layer and the weight updating circuit.

FIG. 16 is a block diagram of weight updating circuit 129 for updating the weight coefficient of the conversion carried out at the i-th neuron 131 included in intermediate layer 132. Each neuron 131 of intermediate layer 132 is provided with one weight updating circuit 129.

Referring to FIG. 16, weight updating circuit 129 includes an adder 152 for producing value $(1-x_i)$ from output $x_i$ of the i-th neuron 131, a multiplier 153 for producing value $x_i(1-x_i)$ by multiplying the output of adder 152 by the output of neuron 131, and k weight calculating circuits 154 for calculating the weight coefficient for the weight applied in neuron 131 for each of the k input signals of $b_1$-$b_k$ (luminance average data $a_{00}$-$a_{33}$). As shown in FIG. 16, each weight calculating circuit 154 carries out weight calculation according to data for correction $\delta0_1 w0_{1i}$-$\delta0_n w0_{ni}$ provided from the neuron in output layer 136, the output of multiplier 153, the corresponding input 134, and the respective weight coefficient corresponding to the input included in neuron 131 for updating the weight coefficient.

Figure 17:
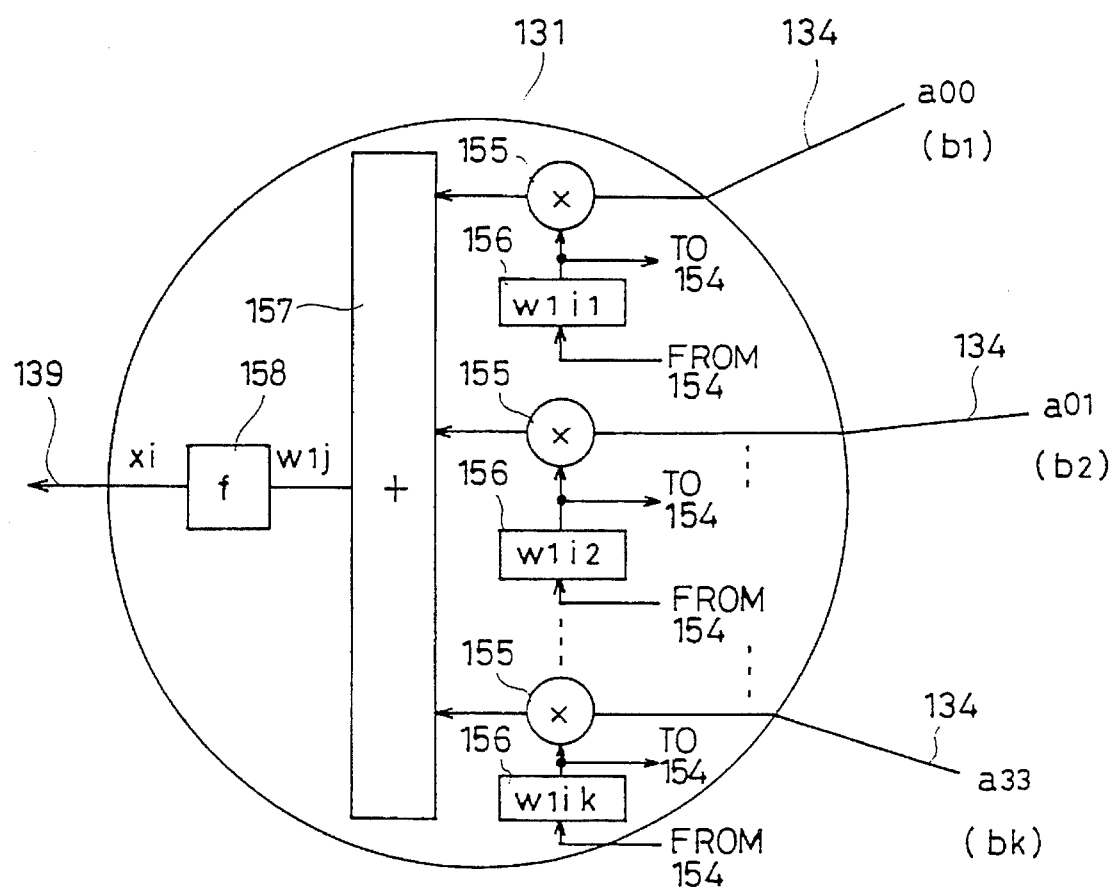
FIG. 17 is a block diagram of a neuron of the input layer.

FIG. 17 is a block diagram of the i-th neuron 131 of the plurality of neuron 131 in intermediate layer 132. Referring to FIG. 17, neuron 131 includes k registers 156 for storing each of weight coefficients $w1_{i1}$-$w1_{ik}$ corresponding to k inputs 134 ($b_1$-$b_k$), k multipliers 155 for multiplying the weight coefficient stored in the corresponding register 156 by each of inputs 134 ($b_1$-$b_k$), an adder 157 for taking the total sum of the outputs of the k multipliers, and a function generator 158 for obtaining output $x_i$ by carrying out conversion indicated by the aforementioned sigmoid function f for output w1 of adder 157.

As shown in FIG. 17, weight coefficient $w1_{i1}$-$w1_{ik}$ stored in each register 156 is updated by weight calculating circuit 154 (FIG. 16). Each weight coefficient $w_{i1}$-$w1_{ik}$ is supplied to weight calculating circuit 154 for respective updating.

Figure 18:
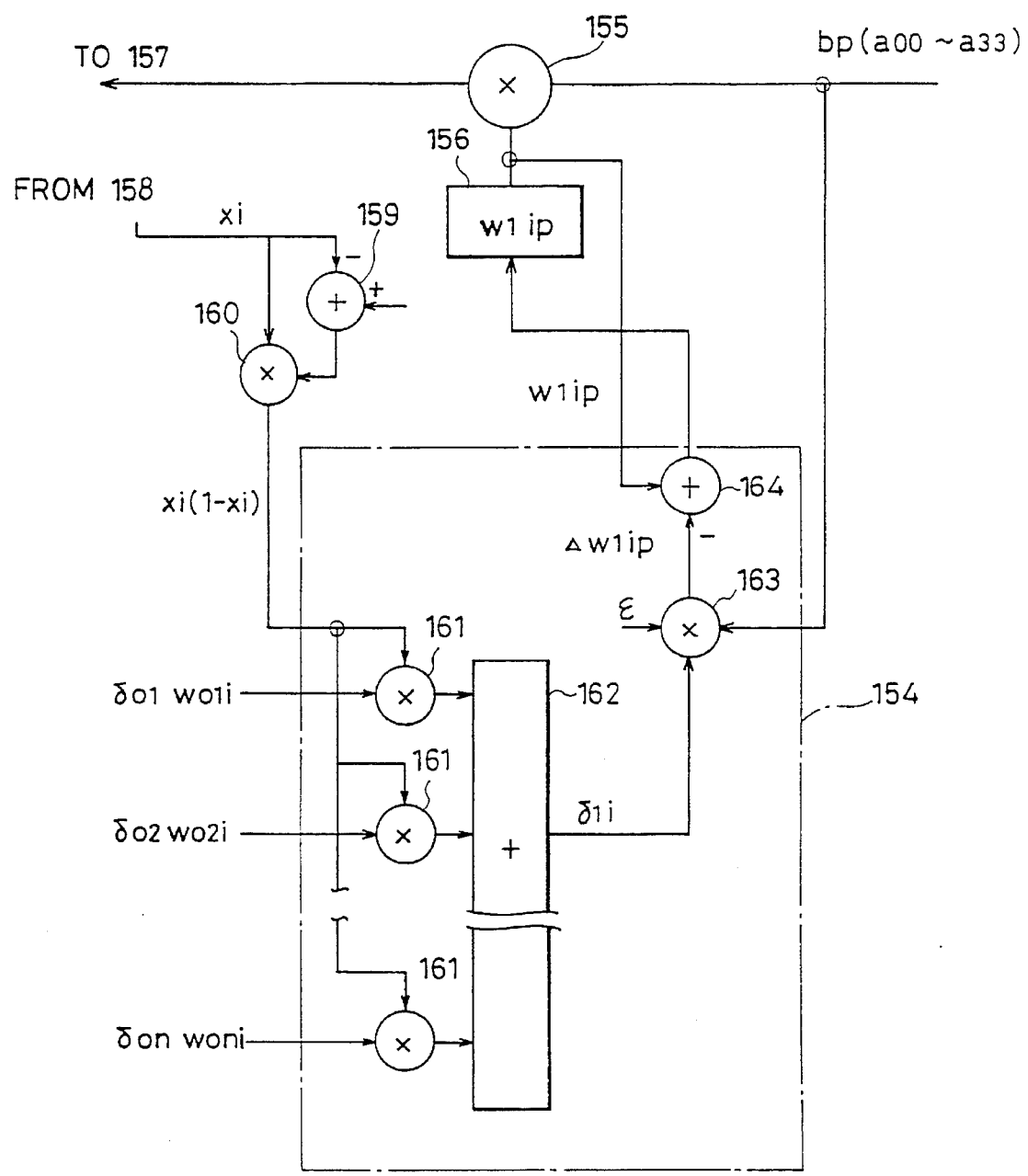
FIG. 18 is a block diagram of a weight calculating circuit for calculating the weight coefficient of the neuron of the input layer.

FIG. 18 is a block diagram of weight calculating circuit 154 for calculating the weight coefficient for each input. The number of weight calculating circuits 154 corresponds to the number of inputs for neuron 131. The weight calculating circuit shown in FIG. 18 is a circuit for calculating weight coefficient $w1_{ip}$ for the p-th input $b_p$ for the i-th neuron 131. Referring to FIG. 18, weight calculating circuit 154 includes n multipliers 161 for multiplying data $\delta0_1 w0_{1i}$-$\delta0_n w0_{ni}$ provided from output layer 136 by value $x_i(1-x_i)$ provided from multiplier 160, an adder 162 for taking the total sum of the outputs of the n multipliers 161 to obtain output $\delta1_i$, a multiplier 163 for calculating the product of the p-th input $b_p$, output $\delta1_i$ of adder 162 and the small positive real number $\epsilon$ to obtain output $\Delta w1_{ip}$, and an adder 164 for taking the difference between weight coefficient $w1_{ip}$ stored in register 156 and the output of multiplier 163 for updating weight coefficient $w1_{ip}$ of register 156 according to the result thereof.

The update process of weight coefficient $w1_{ip}$ by weight calculating circuit 154 is calculated by adding $\Delta w1_{ip}$ obtained by the following equation to weight coefficient $w1_{ip}$.

$$\Delta W1_{ip} = -\epsilon \cdot \delta1_i \cdot b_p \tag{6}$$

$$\text{where } \delta1_i = \sum_{i=1}^{n} \delta0 W0_i (1-x_i) \tag{7}$$

The structure of ANN 107 is as follows. Referring to FIG. 5 again, ANN 107 has the circuit configuration adapted by learning to obtain an output more represented by a teacher signal, by updating weight coefficient $w0_{ji}$ (j=1 to n, i=1 to m), $w1_{ji}$ (j=1 to m, i=1 to k) in each of neurons 131 and 137 according to the teacher signal provided from A/D converter 115 for various inputs provided from area dividing and average producing circuit 106.

Switch 109 carries out selection of learning mode and normal operation mode of ANN 107, in addition to providing an offset value between the output of ANN 107 and the aperture value desired by the operator for providing a teacher signal to ANN 107 at the time of learning mode. The connection of switch 109 to terminal 109b causes voltage 0 to be applied to adder 114. Therefore, the output of D/A converter 108 is directly provided to comparator 112. When switch 109 is connected to terminal 109a, a voltage predetermined by variable resistor 110 is applied to adder 114. This means that the output of adder 114 is offset from the output of D/A converter 108 by the voltage determined by variable resistor 110. By adjusting variable resistor 110 to obtain a diaphragm the user feels optimum, a teacher signal is provided to ANN 107 via adder 114 and A/D converter 115. The update of each weight coefficient of ANN 107 is carried out according to this teacher signal.

The above-video camera operates as follows. Lens 102 gathers incident light from object 101 to form an optical image of the object on the light receiving plane of image sensor 104. The amount of light entering image sensor 104 is regulated by iris plate 103. Image sensor 104 converts the optical image in the frame of a predetermined screen into a video signal which is an electrical signal by photoelectric conversion. The video signal is provided to preamplifier 116 to be amplified. The amplified signal is provided to a signal processing circuit not shown to be converted into the system of television signal. The video signal provided from preamplifier 116 is also supplied to A/D converter 105 of automatic iris control circuit 117.

A/D converter 105 converts the luminance value of the input video signal into a digital value. This digital value is provided to area dividing and average producing circuit 106.

The luminance data of the video signal provided to area dividing and average producing circuit 106 is the line sequential signal obtained by raster-scanning the two dimensional image formed on the light receiving plane of image sensor 104.

Referring to FIG. 7, area dividing and average producing circuit 122 generates area pulses h0–h3 and v0–v3 such as those shown in FIGS. 8(B)–(E) and FIGS. 9(B)–(E), respectively. The area pulse is provided to integrating circuits 121. Area dividing and average producing circuit 122 generates and provides to each integrating circuit 121 a clear signal CL for clearing the integration of the luminance data for each vertical scanning area.

Figure 10:
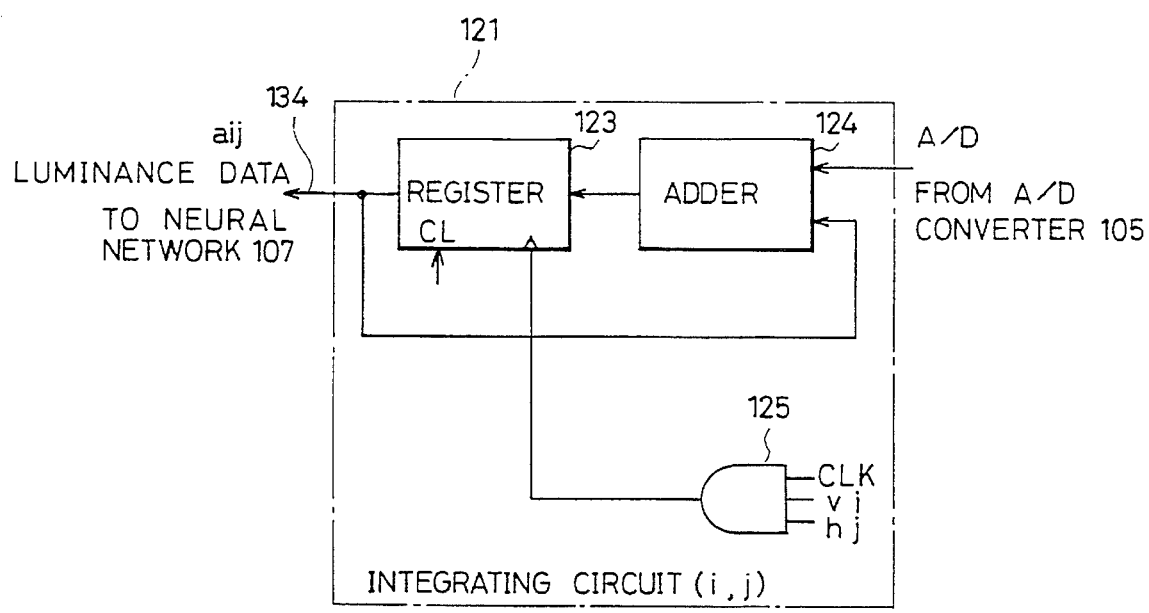
FIG. 10 is a block diagram of an integrating circuit.

Referring to FIG. 10, integrating circuit 121 for integrating the luminance data of the video signal generated from sub-area $a_{ij}$ shown in FIG. 6 operates as follows. Gate circuit 125 takes the AND of clock signal CLK in synchronization with the input luminance data, vertical area pulse $v_i$, horizontal area pulse $h_j$ to provide the same to register 123. Register 123 is supplied with clock signal CLK only when both area pulses of $v_i$ and $h_j$ are at the high potential. The luminance data provided from A/D converter 105 is added with the data in register 123 by adder 124 to be provided to register 123. Register 123 stores the output of adder 124 in synchronization with the clock signal provided from gate circuit 125. By repeating the above-described operation, the luminance data of the video signal generated from sub-area $a_{ij}$ are integrated in register 123.

Clear signal CL is provided from area dividing and average producing circuit 122 (refer to FIG. 7) to register 123 for each vertical period. In response to clear signal CL, the integrated value in register 123 is cleared for each one screen, whereby the luminance integrated value of sub-area $a_{ij}$ is provided as the output of register 123 for each screen.

As described above, the area of each sub-area $a_{ij}$ shown in FIG. 6 is equal to each other, with the number of luminance data provided from a sub-area also equal in number. Therefore, the integrated value provided from register 123 is proportional to the luminance average of the sub-area. The integrated value of the luminance data provided from register 123 can be taken as the luminance average of each sub-area. As will be described afterwards, each luminance average is given weight according to learning in ANN 107. It is therefore considered that each sub-area is not necessarily equal to each other and that the luminance average of each sub-area is not necessarily required to be used for iris control. However, it is considered that the learning speed of recognition pattern by ANN 107 is improved with equal areas of each sub-area, as in the present embodiment.

Referring to FIG. 11, luminance average data 134 provided from each integrating circuit 121 shown in FIG. 7 is branched in an input layer not shown of ANN 107 to be provided to each neuron 131 of intermediate layer 132. Each neuron 131 carries out a predetermined conversion to the input luminance average data 134. This result is provided to each neuron 137 of output layer 136. The operation of each neuron 131 will be described later.

Each neuron 137 of output layer 136 carries out a predetermined conversion to the data provided from each neuron 131 of intermediate layer 132. The converted data is provided to the positive input terminal of each corresponding comparator 135. The operation of each neuron 137 will also be described later.

Each comparator 135 compares the output of the corresponding neuron 137 with a reference value of 0.5. If the output of neuron 137 is 0.5 or above, 1 is provided to encoder 133. If less than 0.5, 0 is provided to encoder 133.

Encoder 133 responds to the output of each comparator 135 to generate as an 8-bit data the number of the neuron 137 corresponding to the comparator 135 that provides 1. The generated 8-bit data is provided to D/A converter 108 (refer to FIG. 5).

In normal operation, switch 109 is connected to terminal 109b. Voltage adder 114 is provided with the output of ANN 107 that has been converted into an analog value by D/A converter 108, and voltage 0. Therefore, the output of voltage adder 114 is a signal having the digital output of ANN 107 converted into an analog data.

The output of voltage adder 114 is provided to the negative input terminal of comparator 112. Comparator 112 compares reference voltage 111 with the output of voltage adder 114 to control iris motor 113 according to the comparison result. Accordingly, iris motor 113 operates to open iris plate 103 when determination is made that the picture is dark, and operates to close iris plate 103 when determination is made that the picture is too bright, from the result of the pattern recognition by ANN 107.

At the time of normal operation, the output of voltage adder 114 is the analog data provided from ANN 107. If this data is digitized by A/D converter 115 and provided as teacher signal to ANN 107, update process of weight in ANN 107 will not be carried out since the teacher signal and the output of ANN 107 coincide with each other.

Referring to FIG. 17, neuron 131 of intermediate layer 132 carries out the following operation for the input luminance average data 134. Each multiplier 155 multiplies the input luminance average data 134 ($b_p$:p=1 to k) by weight coefficient $w1_{i1}$-$w1_{ik}$ stored in each register 156 to provide the output to adder 157. Adder 157 obtains the total sum w1 of luminance average data $b_1$-$b_k$ given weight according to weight coefficients $w1_{i1}$-$w1_{ik}$ by multiplier 155. The total sum w1 is provided to function generator 158, where conversion according to sigmoid function shown in FIG. 14 is carried out. The converted result is provided as intermediate layer output 139 ($x_i$).

Each neuron 131 of intermediate layer 132 carries out the above-described process to provide outputs $x_1$-$x_m$ to each neuron 137 in output layer 136.

Referring to FIG. 13, the j-th neuron 137 of the plurality of neurons 137 in output layer 136 operates as follows. Outputs $x_1$-$x_m$ from each neuron 131 of intermediate layer 132 are provided to the j-th neuron 137. Each multiplier 142 in neuron 137 multiplies output 139 ($x_1$-$x_m$) of intermediate layer 132 by the corresponding weight coefficient $w0_{j1}$-$w0_{jm}$ to provide the same to adder 144. Adder 144 provides the total sum $w0_j$ of the outputs of each multiplier 142 to function generator 145. Function generator 145 carries out sigmoid conversion shown in FIG. 14 for output $w0_j$ of adder 144 to obtain output $y_j$. Output $y_j$ is provided to the corresponding comparator 135 (refer to FIG. 11).

A similar process is carried out in all the neurons 137 in output layer 136, whereby respective outputs $y_1$-$Y_n$ are provided to the corresponding comparator 135.

More briefly, an output for controlling the operation of iris plate 103 is obtained as the output of ANN 107, according to weighting and function conversion carried out in each neuron 131 of intermediate layer 132, the weighting and function conversion carried out in each neuron 137 of output layer 136, and the encoding of the number of the neuron of output layer 136 which outputs 1. Each weight is recalculated by the learning process of ANN 107 according to a teacher signal that will be described afterwards, and updated appropriately. Thus, iris control is carried out automatically reflecting for the learning based on the teacher signal as the output of ANN 107.

The operation of the video camera in the learning process of ANN 107 will be described hereinafter. This learning employs error backpropagation rule, as mentioned before, to update each weight coefficient according to equations (1)–(7). It is known that an output closely matching the teacher signal is obtained as the output of the neural network using the learning according to error backpropagation rule. It is also known that a learned neural network provides an output closely conforming to the liking of the user who provided the teacher signal even for inputs that are not yet learned.

The learning process is executed by switching switch 109 to terminal 109a when the user makes determination that the aperture value obtained using ANN 107 is not optimum. The user adjusts the resistance of variable resistor 110 to obtain an optimum diaphragm. The voltage obtained by variable resistor 110 is applied to one terminal of voltage adder 114. This means that the output of voltage adder 114 is the analog value of the output of ANN 107 added with the voltage regulated by variable resistor 110. In other words, the output of voltage adder 114 has an offset with respect to the output of ANN 107. The iris control voltage provided from adder 114 is converted into a digital value by A/D converter 115 to be applied to ANN 107 as a teacher signal of, for example, 8 bits.

Referring to FIG. 11, decoder 130 decodes the digital data of 8 bits provided from D/A converter 115 to generate 256 one bit teacher signals t0-t255. Each teacher signal is provided to the corresponding neuron 137 of output layer 136. One of the teacher signals of t0-t255 takes a value of 1, while the other remaining teacher signals all take a value of 0.

It is assumed that a luminance average data 134 is provided from area dividing and average producing circuit 106 from ANN 107 in the learning process. The output of output layer 136 is represented as a vector of 256 dimensions expressed by equation (8).

$$(y_0, y_1, \ldots, y_{255}) \quad (8).$$

where $y_j$ takes a value of 0–1.

It has been mentioned that the learning process is carried out according to error backpropagation rule. In other words, the update of the weight coefficient is carried out from the stage of output layer 136 to intermediate layer 132 which is the direction opposite to that of the input signal. Therefore, the process carried out in each neuron 137 of output layer 136 will first be described hereinafter.

Referring to FIGS. 12–15, weight coefficient $w0_{ji}$ corresponding to the i-th output $x_i$ provided from intermediate layer 132 of the j-th neuron 137 of output layer 136 is updated as follows. With particular reference to FIG. 15, value $(y_j-t_j)$ is produced using output $y_j$ of the j-th neuron 137 and the j-th teacher signal $t_j$ by adder 146. Value $(1-y_j)$ is produced by adder 147. Multiplier 148 multiplies the outputs of adders 146 and 147 by output $y_j$ of neuron 137 to produce value $\delta 0_j$ expressed by equation (5).

Multiplier 150 produces and provides to adder 149 the value $\Delta w0_{ji}$ expressed by equation (4) by multiplying the provided small positive real number (threshold value) $\epsilon$ by output $\delta 0_j$ of multiplier 148 by the i-th input $x_i$. Adder 149 calculates and provides to register 143 a new weight coefficient $w0_{ji}$ by reducing output $\Delta w0_{ji}$ of multiplier 150 from weight coefficient $w0_{ji}$ stored in register 143. The update of the weight coefficient of neuron 137 is completed by the new weight coefficient $w0_{ji}$ being stored in register 143.

In multiplier 151 of weight calculating circuit 141, output $\delta 0_j$ of multiplier 148 is multiplied by weight coefficient $w0_{ji}$ to produce value $\delta 0_j \cdot w0_{ji}$ which is provided to intermediate layer 132. This value is used for updating the weight coefficient in the intermediate layer.

Referring to FIGS. 16–18, the update process of weight coefficient carried out in the i-th neuron 131 of intermediate layer 132 is carried out as follows. It is assumed that output $x_i$ is obtained as the output of the i-th neuron 131 for the input luminance average data 134 ($b_1$-$b_k$). With reference particularly to FIG. 18, adder 159 produces value $(1-x_i)$ from output $x_i$ of neuron 131 to provide the same to multiplier 160. Multiplier 160 produces value $x_i (1-x_i)$ from output $x_i$ of neuron 131 and the output of adder 159. This value is provided to each weight calculating circuit 154.

The update process of weight coefficient $w1_{ip}$ for the p-th luminance average data $b_p$ of the i-th neuron 131 is carried out as follows. With particular reference to FIG. 14, weight calculating circuit 154 is provided with learning data $\delta 0_1 w0_{li}, \delta 0_2 w0_{2i}, \ldots, \delta 0_n w0_{ni}$ from each neuron 137 of output layer 136. In other words, each weight calculating circuit 154 of the i-th neuron $x_i$ is provided with data $\delta 0_j \cdot w0_{ji}$ (j=1 to n) provided from the weight calculating circuit of the weight coefficient for the i-th input to each neuron 137, out of the data from each neuron 137 of output data layer 136.

Each multiplier 161 multiplies the corresponding input $\delta 0_1 w0_{1i}$-$\delta 0_n w0_{ni}$ by output $x_i (1-x_i)$ of multiplier 160 to provide the same to adder 162. Adder 162 takes the total sum of the outputs of multiplier 161 to produce value $\delta 1_i$ expressed by equation (7). This value is provided to multiplier 163.

Multiplier 163 multiplies the provided small positive real number $\epsilon$ by output $\delta 1_i$ of adder 162 by the p-th luminance average data $b_p$ to produce and provide to adder 164 $\Delta w1_{ip}$ expressed by equation (6). Adder 164 reads out the value of the corresponding weight coefficient $w1_{ip}$ from register 156 to carry out operation with output $\Delta w1_{ip}$ of multiplier 163 to produce a new weight coefficient $w1_{ip}$ which is provided to register 156. The update of weight coefficient $w1_{ip}$ for the p-th luminance average data $b_p$ of the i-th neuron 131 of intermediate layer 132 is completed by a new weight coefficient $w1_{ip}$ being stored in register 156.

One cycle of learning is completed by carrying out the above described update process of weight coefficient for all registers 143 in each neuron 137 of output layer 136, and for all registers 156 in each neuron 131 of intermediate layer 132.

Thus, ANN 107 is made adaptive to provide a more optimum diaphragm for the object specified by the user from variable resistor 110 by repeating the learning of all weight coefficients in ANN 107 for various teacher signals.

Even in the case of an object state where optimum aperture value can not be obtained by conventional automatic iris control using center-weighted metering and foot-weighted metering, adjustment of the diaphragm is carried out automatically conforming to the usage condition by adjusting the diaphragm manually a few times. The disadvantage of having to manually adjust the diaphragm frequently, as encountered in a video camera having just a conventional manual iris control, is eliminated to realize a video camera having automatic iris control conforming to the usage purpose of the operator.

The network is input with the luminance of all angles of view, and a value selected by the operator taking into consideration the balance of luminance of the main object and the background scenery is provided as the teacher signal to the network. According to this network, an iris control signal is obtained for appropriately adjusting the luminance balance of the main object and the background for all angles of view.

In the video camera that carries out automatic iris control using the above-described neural network, the output of the neural network is always fed back to the iris driving portion even when the operation mode is switched to the manual iris control mode by switch 109. There is possibility of an unstable iris control if the weight coefficient in ANN 107 is constantly updated. To avoid such a problem, only calculation of updating the weight coefficient of the neurons is carried out at the time of manual iris control operation mode, wherein the contents of each weight coefficient register in the neuron is updated when the operation mode is switched from manual to automatic iris control. This prevents the generation of an unstable state of iris control occurring from the update of the coefficients.

The values learned by center-weighted metering and foot-weighted metering is previously written in as the initial value of the weight coefficient in ANN 107. Therefore, the problem does not occur of the operation of the video camera becoming unstable when the video camera is used with automatic iris control right after the purchase of the video camera.

In the above described embodiment, conversion was carried out so that the value of outputs $y_j$, $x_i$ become 0.5 when the values of $w0_j$, $w1_i$ supplied to the function generator is exactly 0, by the function conversion carried out in each neuron. Each neuron should be implemented as follows if the input value to the function generator is a value other than 0 (threshold value) for an output value of 0.5. One terminal that inputs a fixed value of "1" is added to each neuron. A new weight coefficient is defined for this input, whereby this weight coefficient is multiplied by fixed value "1" to be provided to adders 144 and 157. The characteristics of each of function generators 145 and 158 is that shifted by the threshold value in the left and right directions of the graph of FIG. 10. This allows the provision of a threshold value for each neuron. This weight coefficient may be updated any time by the learning process.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A video camera comprising:

optical means for gathering incident light from an object to form an image on a predetermined image information plane;

incident light amount regulating means, responsive to an incident light amount regulating signal, for regulating an incident light amount;

image sensing means for image sensing the image of the object within a predetermined frame formed by said optical means to provide a luminance signal;

luminance distribution characteristics extraction means, connected to said image sensing means, for dividing said predetermined frame into a predetermined plurality of sub-areas and for extracting a luminance distribution of the image in said predetermined frame as a luminance value for each of said sub-areas according to said luminance signal to provide the extracted luminance distribution as a plurality of luminance distribution signals, said luminance distribution characteristics extraction means including A/D converting means for A/D converting said luminance signal provided from said image sensing means and for outputting a digital luminance data indicating the luminance of the image, and average luminance calculating means for integrating said digital luminance data over a predetermined integrating time period for each of said sub-areas to calculate an average luminance for each of said sub-areas as said luminance distribution signals;

adaptive means, coupled to said luminance distribution characteristics extraction means and having an artificial neural network to which said plurality of luminance distribution signals are input, for generating an aperture signal in accordance with a predetermined conversion, the predetermined conversion being made adaptive so that an offset between a teacher signal and said aperture signal is minimized;

target value generating means, coupled to an output of said adaptive means, for generating a target value signal for determining a target value of said incident light amount regulating signal;

means for producing said incident light amount regulating signal according to said target value signal; and manually operable selecting means, responsive to operation by the user and operatively connected to said target value generating means, for selecting said aperture signal or an aperture signal as arbitrarily offset by the user as said target value signal output from said target value generating means, said target value signal being used to produce said teacher signal.

2. The video camera according to claim 1, wherein said artificial network of said adaptive means comprises:

an intermediate layer including a plurality of first converting means, each for obtaining one output by performing a first predetermined conversion of said luminance distribution signals;

an output layer having a plurality of second converting means, each for obtaining one output by performing a second predetermined conversion of an output of said intermediate layer;

output converting means for performing a third predetermined conversion of an output of said output layer to generate said aperture signal; and conversion updating means for adaptively updating said first and second predetermined conversions according to the offset between said aperture signal output of said artificial neural network and said teacher signal so that the offset is minimized.

\* \* \* \* \*